United States Patent
Fuyuki

(10) Patent No.: US 7,847,237 B2
(45) Date of Patent: Dec. 7, 2010

(54) METHOD AND APPARATUS FOR TESTING AND EVALUATING PERFORMANCE OF A SOLAR CELL

(75) Inventor: Takashi Fuyuki, Ikoma (JP)

(73) Assignees: National University Corporation Nara, Ikoma-shi, Nara (JP); Institute of Science and Technology

( * ) Notice: Subject to any disclaimer, the term of this patent is extended or adjusted under 35 U.S.C. 154(b) by 0 days.

(21) Appl. No.: 12/226,820

(22) PCT Filed: Apr. 25, 2007

(86) PCT No.: PCT/JP2007/058989

§ 371 (c)(1),
(2), (4) Date: Oct. 29, 2008

(87) PCT Pub. No.: WO2007/129585

PCT Pub. Date: Nov. 15, 2007

(65) Prior Publication Data

US 2009/0127448 A1    May 21, 2009

(30) Foreign Application Priority Data

May 2, 2006   (JP) ............... 2006-128278

(51) Int. Cl.
*H01J 7/24* (2006.01)
*G01J 1/44* (2006.01)
*G01R 31/00* (2006.01)

(52) U.S. Cl. ............... 250/238; 250/214 R; 250/338.1; 324/501; 324/752

(58) Field of Classification Search ............... 250/238, 250/214 R, 338.1; 136/244, 254, 258, 261; 324/501, 752

See application file for complete search history.

(56) References Cited

U.S. PATENT DOCUMENTS 5,334,844 A * 8/1994 Pollard et al. ............... 250/330
5,834,661 A * 11/1998 Nonaka et al. ............... 73/866

(Continued)

FOREIGN PATENT DOCUMENTS

EP    1416288 A1    5/2004

(Continued)

OTHER PUBLICATIONS

Fuyuki, T. et al., "One shot mapping of minority carrierdiffusion length in polycrystalline silicon solar cells using electroluminescence", Jan. 3-7, 2005, Photovoltaic Specialists Conference, 2005. Conference Record of the Thirty-first IEEE, pp. 1343-1345.*

(Continued)

*Primary Examiner*—Thanh X Luu
(74) *Attorney, Agent, or Firm*—Nixon & Vanderhye P.C.

(57) ABSTRACT

A method for evaluating performance of a solar cell, comprising: a current passing step (S1) of passing, in a forward direction, a direct current with respect to a solar cell element constituting the solar cell; a temperature control step (S2) of heating the solar cell element and controlling a heating temperature of the solar cell element; and a light emission detecting step (S3) of detecting light emission characteristics of light generated from the solar cell element due to the passing of the direct current in the current passing step and the heating of the solar cell element in the temperature control step (S2).

17 Claims, 17 Drawing Sheets

U.S. PATENT DOCUMENTS

| | | | |
|---|---|---|---|
| 6,225,640 | B1 | 5/2001 | Glenn et al. |
| 2005/0133723 | A1* | 6/2005 | Lee et al. .................. 250/338.4 |
| 2005/0252545 | A1* | 11/2005 | Nowlan et al. .............. 136/290 |
| 2008/0088829 | A1 | 4/2008 | Fuyuki |

FOREIGN PATENT DOCUMENTS

WO          2006/059615          6/2006

OTHER PUBLICATIONS

International Search Report for PCT/JP2006/058989, mailed Jun. 5, 2007.

Fuyuki, "Electroluminescence-ho Ni Yoru Kesshokei Silicon Taiyo Denchi no Kino Hyoka", 2006 Nen Shunki Dai 53 Kai Oyo Butsurigaku Kankei Rengo Koenkai Keon Yokoshu, Separate vol. 0, 2006, p. 100.

T. Fuyuki et al., "Photographic Surveying of Minority Carrier Diffusion" Applied Physics Letters 86, 262108 (2005).

N. Sakitani et al., "Evaluation of Recombination Velocity at Grain Boundaries in Poly-Si Solar Cells with Laser Beam Induced Current" Solid State Phenomena vol. 93 (2003), pp. 351-354.

J. Isenberg et al., "Spatially Resolved IR-Measurement Techniques for Solar Cells" Presented at the 19$^{th}$ European Photovoltaic Solar Energy Conference, Jun. 7-11, 2004, Paris.

E. Rueland et al., "Optical μ-Crack Detection in Combination With Stability Testing for In-Line- Inspection of Wafers and Cells" 20$^{th}$ European Photovoltaic Solar Energy Conference, Jun. 6-10, 2005, Barcelona, Spain.

International Search Report for PCT/JP2007/058989, mailed Jun. 5, 2007. (submitted with IDS Oct. 29, 2008).

Fuyuki, "Electroluminescence-ho Ni Yoru Kesshokei Silicon Taiyo Denchi no Kino Hyoka", 2006 Nen Shunki Dai 53 Kai Oyo Butsurigaku Kankei Rengo Koenkai Koen Yokoshu, Separate vol. 0, 2006, p. 100. (submitted with IDS Oct. 29, 2008). "Extended Abstracts (The 53$^{rd}$ Spring Meeting, 2006); The Japan Society of Applied Physics and Related Societies" (Partial English translation and discussion of relevance of publication).

Takashi Fuyuki et al., "Quantitative Imaging of Excess Minority Carrier Density" . . . 21 st European Photovoltaic Solar Energy Conference Sep. 4-8, 2006 Dersden, Germany.

Athapol Kitiyanan, et al., "Electroluminescence Analysis of Crystalline . . . " 2$^{nd}$ International Workshop on Science and Technology on Crystalline Si Solar Cells Dec. 9-12, 2007 Xiamen , China.

"Observation of Electroluminescence from Amorphous Silicon Solar Cells at Room Temperature", Japanese Journal of Applied Physics vol. 21, No. 8, Aug. 1982 pp. L473-L475.

Keda Wang et al.; "Electroluminescence and forward bias current in p-i-n and p-b-i-n a-Si;H solar cells" dated May 1, 1993.

M.A. Ordaz et al.; "Machine vision for solar cell characterization" dated Dec. 31, 2000.

K. Penner, Journal de Physique: "Electroluminescence form Silicon Devices" dated Sep. 1988.

\* cited by examiner

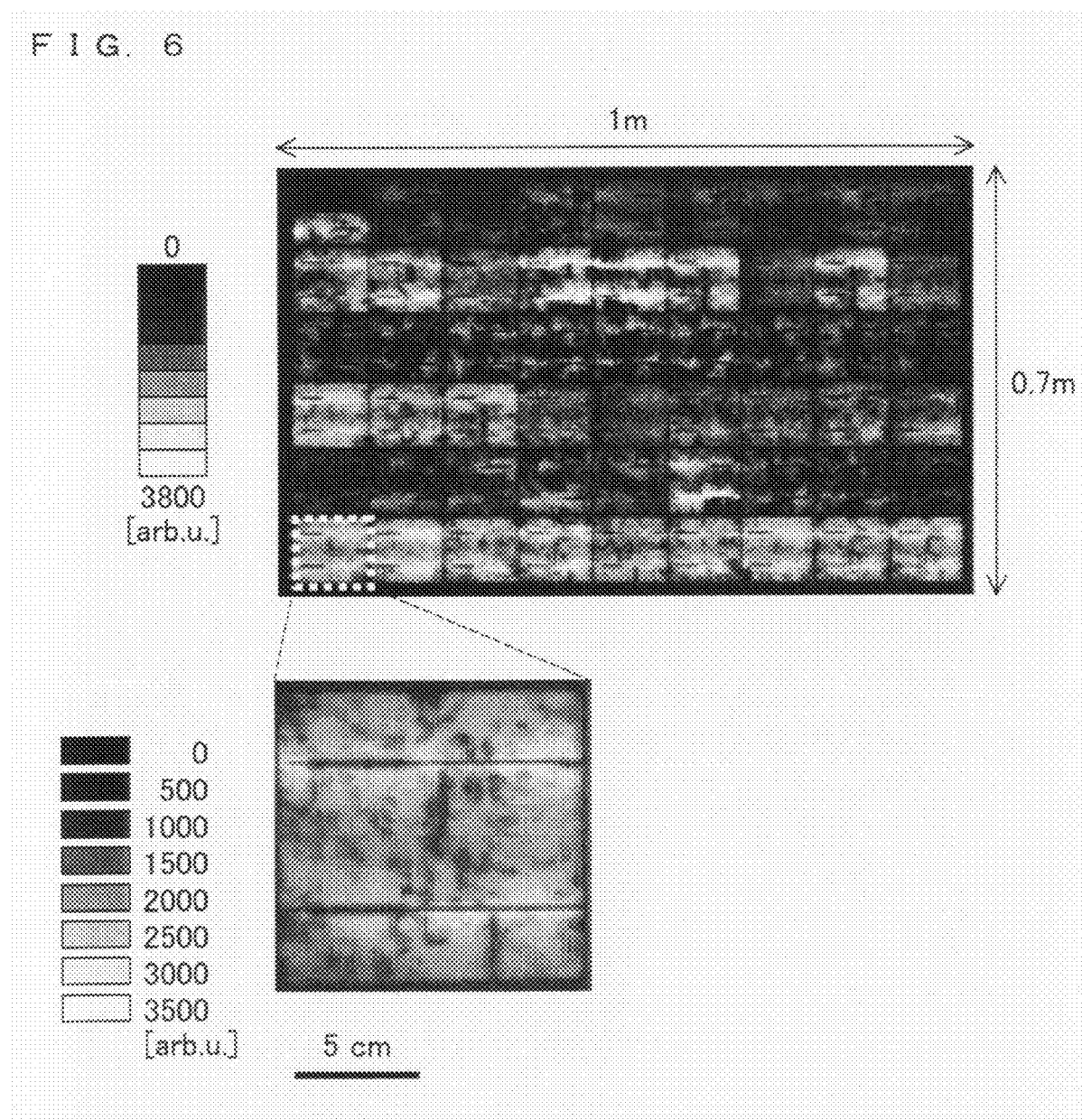

EL Image 5 cm

Surface 5 cm 5 mm 5 mm

LBIC Image 5 mm

EL Image 5 mm

SEM Image 5 mm

FIG. 13
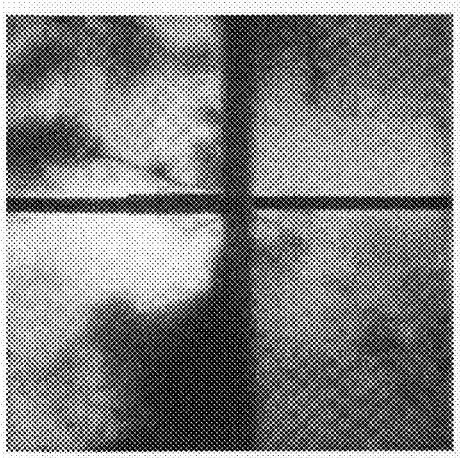
(a)
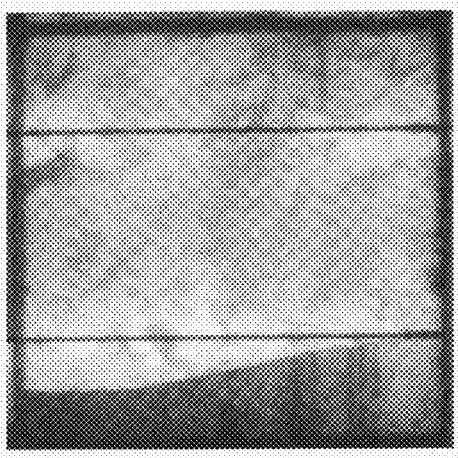
(d)
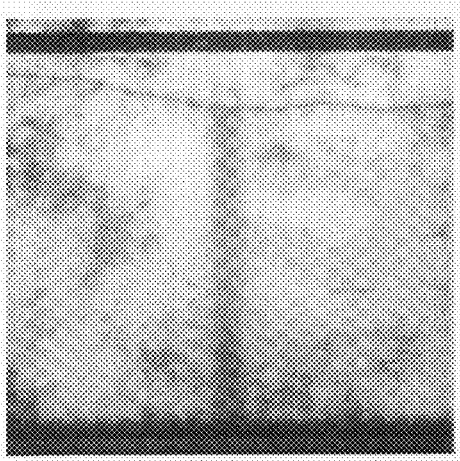
(b)
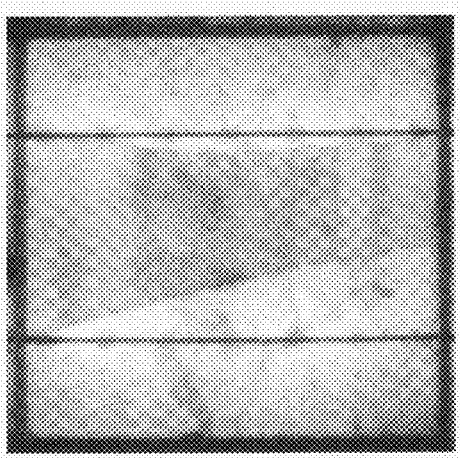
(e)
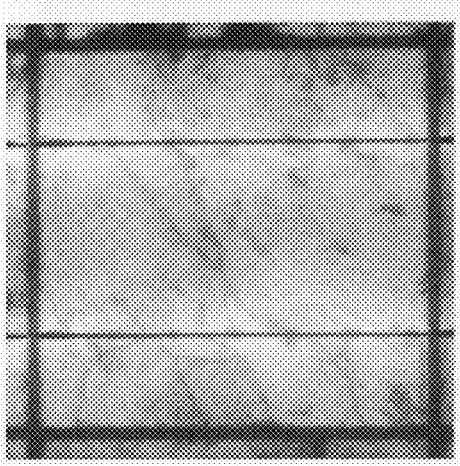
(c)
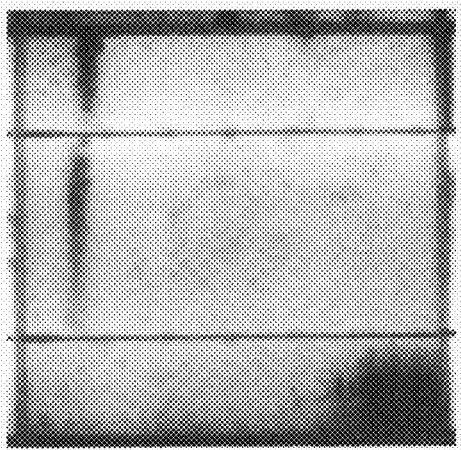
(f)

METHOD AND APPARATUS FOR TESTING AND EVALUATING PERFORMANCE OF A SOLAR CELL

This application is the U.S. national phase of International Application No. PCT/JP2007/058989 filed, 25 Apr. 2007, which designated the U.S. and claims priority to Japanese Application No(s) 2006-128278 filed 2 May 2006, the entire contents of each of which are hereby incorporated by reference.

TECHNICAL FIELD

The present invention relates to (i) a method and (ii) an apparatus for easily and accurately evaluating a solar cell in terms of photoelectric conversion performance without a use of a large-sized detection apparatus or the like and (iii) use thereof. Especially, the present invention relates to (I) a method and (II) an apparatus for easily and accurately evaluating a solar cell in terms of photoelectric converting performance by passing an electric current through solar cell elements (e.g., a solar cell module, solar cell panel, or solar cell element per se) constituting the solar cell, and analyzing light emission characteristics due to the electric current passage.

BACKGROUND ART

Use of solar energy has been advancing so as to preserve the environment of the earth, and installation of solar cell modules consisting of solar cell elements connecting a plurality of solar cells to roofs and walls of common buildings and houses are in progression. Meanwhile, implementation of solar cells which incorporate semiconductors that are advantageous to enlarging of size, particularly solar cells made of Si (silicon) and the like are rapidly developing. Enhancement of silicon crystal solar cell which contribute to reduction in costs and enhancement in efficiency of photovoltaic power generation system is an issue to be solved in the future.

In order to improve performance and reliability of the silicon crystal solar cells, it is important to analyze diffusion length of a minority carrier and an in-plane defect, and feedback an analysis result to an optimization design of an arrangement of the solar cell elements and to a production process of the solar cell element.

The in-plane defect remarkably decreases output characteristics of the solar cell elements, which causes bad influence in photoelectric conversion efficiency of the solar cell module. As a result, spread of the silicon crystal solar cells are interrupted due to decrease in the photoelectric conversion efficiency and an increase in costs which are caused by the decrease in the photoelectric conversion efficiency. Accordingly, development of a method for evaluating performance of the solar cell that can detect the in-plane defect is in need for.

Meanwhile, so-called EBIC (Electron Beam Induced Current) and LBIC (Laser Beam Induced Current), that is, methods for measuring a current or voltage induced by using an electron beam or laser beam and thereby analyzing diffusion length of minority carriers and defects (grain boundary/transgranular), are widely used as the method for evaluating the performance of the solar cell, for example.

By the EBIC or LBIC, it is possible to measure and evaluate a degree of an elective activity or diffusion length of the minority carriers in solar cells locally. By use of a result of this measurement and evaluation, evaluation of the photoelectric conversion efficiency and quality of the solar cell is possible (see Non Patent Document 1).

Moreover, an apparatus has been revealed, which apparatus analyzes, based on infrared light intensity, distribution of heat generated due to a bias in a forward direction, so as to detect a short circuit section (see Non Patent Document 2).

Furthermore, a technique has also been revealed that a back side of a substrate is exposed to strong light so as to detect leakage of light, which as a result detects a substrate crack (see Non Patent Document 3).

[Non Patent Document 1]
N. Sakitani, et al., "Evaluation of Recombination Velocity at Grain Boundaries in Poly-Si Solar Cells with Laser Beam Induced Current" Solid State Phenomena Vol. 93 (2003), pp. 351-354

[Non Patent Document 2]
J. Isenberg, et al., "SPATIALLY RESOLVED IR-MEASUREMENT TECHNIQUES FOR SOLAR CELLS" Presented at the 19$^{th}$ European Photovoltaic Solar Energy Conference, 7-11 Jun. 2004, Paris

[Non Patent Document 3]
Rueland, et al., "OPTICAL μ-CRACK DETECTION IN COMBINATION WITH STABILITY TESTING FOR IN-LINE-INSPECTION OF WAFERS AND CELLS" 20$^{th}$ European Photovoltaic Solar Energy Conference, 6-10 Jun. 2005, Barcelona, Spain The in-plane defects in a solar cell are, more specifically, faults of external causes such as a substrate crack, electrode rupture, loose connection and the like, and faults of internal causes such as crystal defect, dislocation, grain boundaries and the like that are caused by physical properties of the substrate material.

Not only is the substrate crack large in size which occurs so as to cross the substrate, but also generates in minute areas inside the substrate. The substrate crack causes bad influence to photoelectric conversion functions such as reduction of photoproduction current as a centroid of a recombination of minority carriers, and a rise in series resistance by blocking the current passage. Many of the faults of external causes generate due to fragility of mechanic intensity and external force (including thermal warp) given to the substrate during the production process of the solar cell. Simple detection of the defect and feedback of this to the conditions of the production process so as to make improvements links directly to improvement of long-term reliability and increase in production yield rate of the solar cell. Moreover, analysis of whether the cause of the decrease in the photoelectric conversion function is the fault of the external cause mainly based on mechanic intensity or the fault of the internal cause based on material property, connects to high-function and high-reliability of the solar cell. Accordingly, carrying out the detection of these faults easily links to future implementation and spreading of the solar cells.

However, the foregoing EBIC and LBIC devices require a large-scale apparatus to detect the defect of the solar cell. This causes the need for large sum investment for plant and equipment. Further, with the EBIC and LBIC devices, there are many limitations in arrangements such that a two-dimensional scanner having a good position decision accuracy and a scanner probe that uses electron beams or lasers are required to measure a two-dimensional distribution of the minority carrier diffusion length, an electron microscope is required so as to irradiate the electron beams, and a multiwavelength light source is required for radiating a laser beam. As such, a problem exists such that the method for evaluating the solar cell module is not easily carried out.

Moreover, a device which analyzes an exothermic distribution from the solar cell has poor sensitivity and resolving power. Therefore, the defects occurring in the solar cell cannot be accurately detected.

Furthermore, with the technique of detecting the substrate crack by detecting the light leakage, it is not possible to detect minute cracks in which light does not leak, that is, so-called hair cracks, micro cracks and the like.

Therefore, there has been a strong demand for development of (i) a method and (ii) an apparatus for evaluating a solar cell, each of which make it possible to easily and accurately evaluate photoelectric conversion performance of a solar cell module and (iii) use thereof. Especially, silicon polycrystalline solar cell has been rapidly advanced to practical use. Development of an evaluation method and the like which contributes to high performance of the polycrystalline solar cell is an immediate issue, in which various defects in the solar cell are detected.

In view of the aforementioned problem, an object of the present invention is to provide (i) a method and (ii) an apparatus for evaluating a solar cell, each of which makes it possible to easily and accurately evaluate a solar cell module in terms of its photoelectric conversion, without requiring a large-sized facility and (iii) use thereof.

DISCLOSURE OF INVENTION

As a result of diligent studies to solve the problem, the inventors of the present invention found that luminescence could be observed under normal carrier introducing condition at room temperature when passing a forward current through monocrystalline and/or polycrystalline semiconductor silicon, and experimentally confirmed that light emission intensity of the luminescence was in 1:1 proportion with distribution of a diffusion length of minority carriers, which is largely influential on a photoelectric conversion performance. The present invention was accomplished based on this finding and confirmation. The present invention was accomplished on such novel knowledge and encompasses the following inventions.

A method for evaluating performance of a solar cell comprising: a current passing step of passing, in a forward direction, a direct current with respect to a solar cell element constituting the solar cell; a temperature control step of heating the solar cell element and controlling a heating temperature of the solar cell element; and a light emission detecting step of detecting light emission characteristics of light generated from the solar cell element due to the passing of the direct current in the current passing step and the heating of the solar cell element in the temperature control step.

In addition, an apparatus for evaluating photoelectric conversion performance of the solar cell, comprising: current passing means for passing a direct current in a forward direction with respect to a solar cell element constituting the solar cell; temperature control means for heating the solar cell element and controlling a heating temperature of the solar cell element; and light emission detecting means for detecting light emission characteristics of light generated from the solar cell element due to the passing of the direct current by the current passing means and the heating of the solar cell element by the temperature control means.

In addition, a method for maintaining a solar cell, comprising the steps of: carrying out evaluation of a solar cell provided on a structural object by use of the aforementioned apparatus; causing a judging device to judge, based on an evaluation result of the solar cell, whether or not a solar cell element whose performance is lower than a predetermined value is included in the solar cell; and causing a replacement instructing device to instruct a replacement party to replace the solar cell element, whose performance is lower than the predetermined value, via a communication network.

Further, a solar cell maintenance system, comprising: the aforementioned apparatus; a judging device for judging, based on an evaluation result of the apparatus, whether or not a solar cell element whose performance is lower than a predetermined value is included in a solar cell provided on a structural object; and a replacement instructing device for instructing a replacement party to replace the solar cell element, whose performance is lower than the predetermined value, via a communication network.

In addition, a method for producing a solar cell module, comprising, as one step thereof, the method for evaluating the solar cell.

Note that, the judging means in the apparatus for evaluating the solar cell, and each functional block of the method and system for performing maintenance (for example, judging device and replacement instructing device) may be realized by a computer. In this case, the scope of the present invention includes also (i) a program causing a computer to function as the means of the apparatus for evaluating the solar cell and the like and (ii) a computer-readable recording medium storing therein the foregoing program.

According to the method and apparatus in accordance with the present invention for evaluating a solar cell, there is adopted an electroluminescence method carried out due to passing of a current in a forward direction. Therefore, an effect is attained such that a defect in a solar cell module is easily and accurately detected so that photoelectric conversion performance of the solar cell module is evaluated, without a need of a large-scale facility as compared to a conventional method and apparatus for evaluating the solar cell.

Furthermore, the method and apparatus of the present invention for evaluating the solar cell is advantageous over the conventional art, for example, in (i) it is not necessary to use a scanning probe (electron beam, laser), thus the measurement can be done easily, (ii) a large facility is not necessary, thus it is possible to observe and evaluate the solar cell as a product (as a product completed in the manufacturing factory or as a product implemented on a construction). Because of these and other advantages, it is also possible to establish a business model such as a maintenance method or a maintenance system in which a solar cell implemented on a construction is evaluated on a regular basis. The maintenance method and the maintenance system makes it possible to perform maintenance of the solar cell implemented on a construction, which has not been seldom carried out. Further, the maintenance method and the maintenance system make it possible to select and replace only a solar cell element whose performance is poor, instead of replacing the whole solar cell module. This attains high efficiency and low cost.

For a fuller understanding of the nature and advantages of the invention, reference should be made to the ensuing detailed description taken in conjunction with the accompanying drawings.

BRIEF DESCRIPTION OF DRAWINGS

FIG. 3(b) is a view schematically illustrating an arrangement of a temperature control section in an apparatus according to the present embodiment for evaluating a solar cell.

FIG. 6 is a view of an image picturing a state of a solar cell module.

FIG. 13 is a view of an image picturing a state of a crystal defect and substrate crack which occurs to an Si solar cell element.

Figure 1:
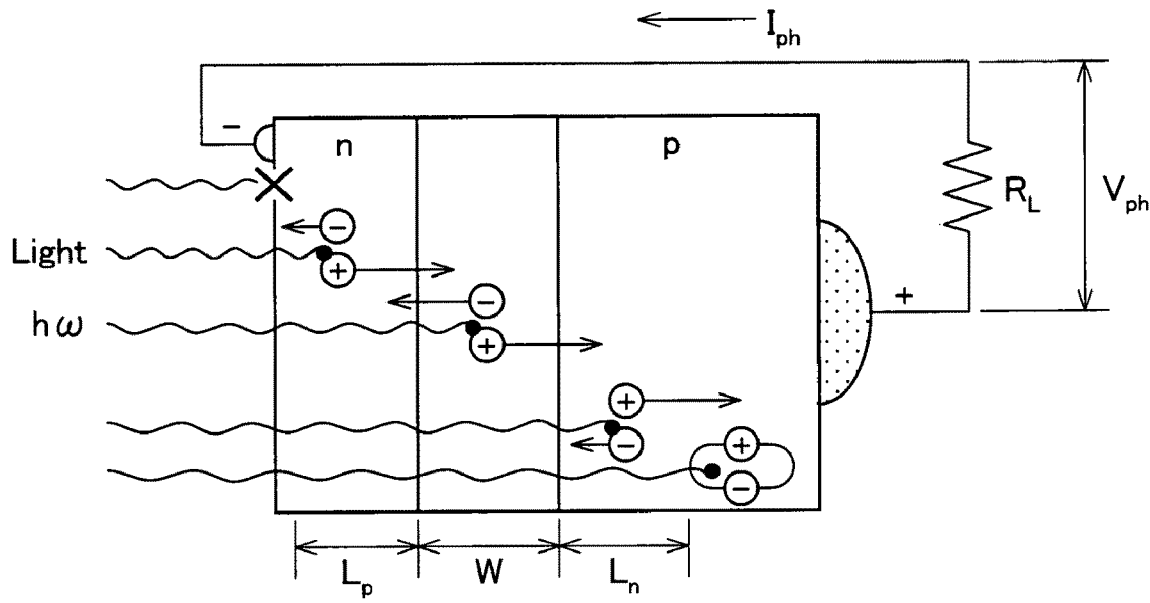
FIG. 1 is a view schematically illustrating a basic structure and operation principle of a solar cell module.

REFERENCE NUMERALS 10 evaluating apparatus current passing section (current passing means)
12 light emission detecting section (light emission detecting means)
14 temperature control section (temperature control means)
20 judging device (judging device, judging means)
30 replacement instructing device
40 communication network
100 maintenance system

BEST MODE FOR CARRYING OUT THE INVENTION

One embodiment of the present invention is described below.

<1. Method for Evaluating Solar Cell>

Referring to FIG. 1, a solar cell module is briefly described in terms of its basic structure and operation principle. For easy explanation, a solar cell element made from silicon semiconductor is described by way of example. In this Description, what is meant by the term "solar cell element" is a smallest constituent unit for generating an electric current on receiving light thereon due to photoconductive effect and/or photovoltaic effect. For example, the solar cell element is in a size of 10×10 cm to 15×15 cm. Moreover, what is meant by the term "solar cell module" is a module formed by linking a plurality of the solar cell elements. One example of the solar cell module is formed by linking 10 to 50 solar cell elements and is in a size of 0.5×0.5 m to 1.0×1.0 m. Moreover, in this Description, the term "solar cell module" encompasses "solar cell panel" that includes a plurality of the modules. Furthermore, the term "solar cell" is to mean any one or all of the solar cell element, solar cell module, and solar cell panel.

As described in FIG. 1, the solar cell element made from silicon semiconductor has such a structure that a thin n-type silicon layer (hereinafter, referred to as "n layer") is provided on a p-type silicon layer (hereinafter, referred to as "p layer"). (Although not illustrated here, the arrangement also includes for example a P$^+$/n type solar cell element, and the present invention is also applicable thereto.) In FIG. 1, $L_p$ is a diffusion length of holes, which are minority carriers in the n layer.

$L_n$ is a diffusion length of electrodes, which are minority carriers in the p layer. W is a depletion layer width (a region in which an electric field exists without electrons and holes) formed by a pn junction. In short, the diffusion lengths are distances in which the minority carriers formed by light can move (diffuse) before its recombination with majority carriers and consequent disappearance.

The light is radiated from above a surface of the n layer. The presence of many donors in the n layer shortens $L_p$. Thus, it is arranged such that the n layer is thin and most of light absorption is carried out in the p layer. Among electron-hole pairs generated by the light in the range of $L_n$ from an edge of the depletion layer in FIG. 1, the electrons, which are the minority carriers, are diffused in the left direction and reach the depletion layer. Then, the electrons are moved toward the n layer by the electric field in the depletion layer, and form a photo current. On the other hand, (i) electrons from the electron-hole pairs formed by the light in a far distance from $L_n$ and (ii) the holes, which are majority carriers, are recombined with each other to generate heat, whereby the electrons will not reach the depletion layer and contribute to the photo current.

This means that the longer diffusion length of the electrons, which are the minority carriers of the p layer, attains better photoelectric conversion performance because the longer diffusion length of the electrons make it possible for electrons generated in deeper portion of the solar cell element to contribute to the current. In this way, the diffusion length of the minority carrier (electron) and the photoelectric conversion performance are closely related with each other in the solar cell element.

As a result of diligent studies, the inventors of the present invention found that passing a forward current through the solar cell element made from silicon conductor introduces electrons in the p layer where electrons are minority carriers, and the electrons thus introduced are recombined with holes in the p layer thereby causing light emission. Further diligent studies carried out by the inventors revealed that, among the light emission characteristics of the solar cell element, a light emission intensity of the emitted light and distribution of the diffusion length of the minority carrier are in 1:1 proportion. As a result, the inventors accomplished the present invention that makes it possible to easily and accurately evaluate the photoelectric conversion performance of the solar cell element by using, as an indicator, the light emission characteristics of the solar cell element that is caused to emit light by passing a current therethrough.

That is, a method according to the present invention for evaluation a solar cell, the method should at least include: a current passing step of passing, in a forward direction, a direct current with respect to a solar cell element constituting the solar cell (for example, a solar cell module or solar cell element itself); and a light emission detecting step of detecting light emission characteristics of light generated from the solar cell element due to the passing of the direct current in the current passing step. Apart from that, the present invention is not particularly limited and may employ a conventionally known method etc. in terms of specific steps other than these steps, materials, conditions, device and equipment to use, etc.

Here, what is meant by the term "performance evaluation" in this Description is evaluation of the performance of the solar cell module or the solar cell element, which is a constituent of the solar cell module, in terms of photoconductive effect and/or photovoltaic effect. Moreover, the photoelectric conduction performance and the diffusion length of the minority carrier are closely related with each other as described above. Thus, the performance evaluation may be evaluation of the diffusion length of the minority carrier.

Figure 2:
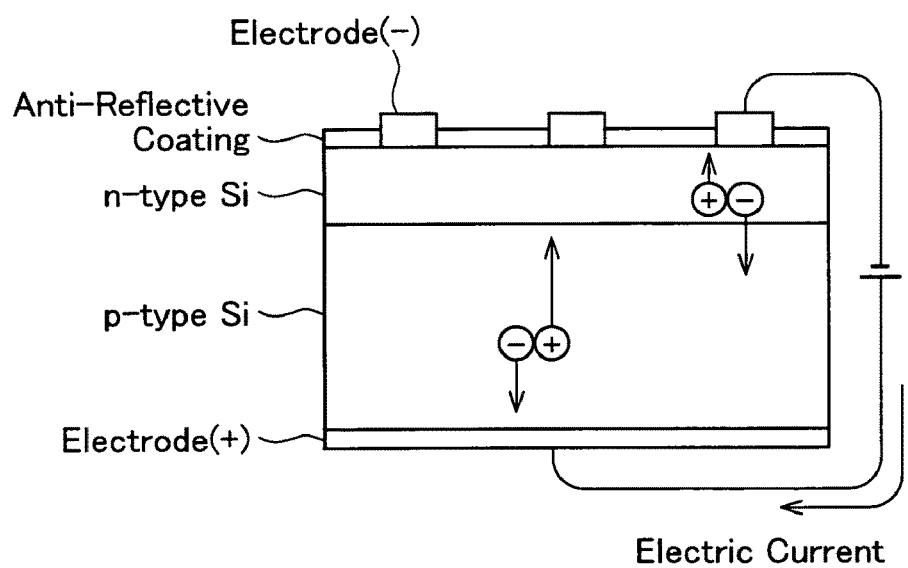
FIG. 2 is a view schematically illustrating passage of a forward current through a solar cell element.

In the current passing step, the wording "passing the direct current in the forward direction" means to bias in the so-called forward direction, as illustrated in FIG. 2. The direct current is passed therethrough in the forward direction by externally applying a voltage which is positive (+) on the p-type region side and negative (−) on the n-type region side of the pn junction.

In the current passing step, a device for passing the current through the solar cell element may be a power supply or the like conventionally known, and is not particularly limited. For example, a general constant current source may be used as the device for passing the current through the solar cell element.

In the light emission detecting step, light detecting means conventionally known may be employed, which is capable of detecting light emission characteristics of the light emitted from the solar cell element. A light detecting means to be employed in the light emission detecting step is not particularly limited in terms of specific configuration. For example, a conventionally known light detecting device such as a CCD camera or the like may be used in the light emission detecting step. Moreover, the detection of the light emission characteristics may be carried out by detecting the light emission characteristics for the whole solar cell module at once by using a large-sized light detecting device or a so-called line scanner for 1-dimensional scanning, or by detecting light emission characteristics for a particular portion of the solar cell module by using a small-sized light detecting device. That is, there is no particular limitation on the light emission detecting step in terms of its specific method and the like, and a conventional technique may be employed as appropriate.

Moreover, the term "light emission characteristics" encompasses light emission intensity of the emitted light, and spectral characteristics (light emission intensity of each spectrum).

According to the method of the present invention for evaluating a solar cell, a whole solar cell module formed by linking solar cell elements in series can be evaluated in its performance by passing the current once therethrough. That is, once the current is applied, the current passes through all the solar cell elements constituting such a solar cell module thereby causing all the solar cell elements to emit light. In this case, the present invention may be arranged to measure an in-plane distribution of momentary luminance batchwise. More specifically, for example, this may be carried out by measuring a large area by 2-dimensional batchwise measurement or 1-dimensional line scanner, e.g., by using a CCD or the like. Note that the present invention is not limited to this. By detecting the light emission characteristics for the whole solar cell module by using a large-sized light detecting means or a line scanner for 1-dimensional scanning, it is possible to plainly find out which solar cell element at which portion of the solar cell module is low in its performance, and it is easy to evaluate it. Of course, it is possible to evaluate the solar cell elements individually.

As a result of further diligent studies, the inventors found that a temperature dependence differs between a fault of an external cause (hereinafter referred to as "external cause defect") such as a substrate crack, an electrode rupture, loose connection and the like and a fault of an internal cause (hereinafter referred to as "internal cause defect") such as crystal defect, dislocation, grain boundaries and the like. More specifically, it was found that the internal cause defect is effected by temperature change while the external cause defect is not effected by the temperature change. Therefore, the invention of the present application is accomplished such that an electric current is passed through solar cell elements or a solar cell module so that light is emitted, while the solar cell elements or the solar cell module is heated so that the external cause defect and the internal cause defect are detected separately, by use of, as an indicator, light emission characteristic due to a change in heating temperature.

Namely, a method according to the present invention for evaluating the solar cell preferably further includes a temperature control step of heating the solar cell element and controlling a heating temperature of the solar cell element.

With the method according to the present invention for evaluating the solar cell, a defect caused by a decrease in solar cell performance is easily and accurately detected by changing, in a broad range, the heating temperature of the solar cell elements or the solar cell module so as to measure light emission characteristics in the light emission detecting step. Moreover, a type of defect is easily specified due to the temperature change. Therefore, the substrate crack (external cause defect) is easily detected, which substrate crack is a mechanical damage that gives significant influence on particularly solar cell properties.

As described above, high-speed and simple two-dimensional analysis of (i) a diffusion length of a minority carrier and (ii) an in-plane defect is possible. Consequently, feedback of a result of analysis to an optimization design of an arrangement of the solar cell elements and to a production process of the solar cell elements allow attainment of improvement in performance and reliability.

Not only is the substrate crack large in size which is generated so as to cross the substrate, but also is generated in minute areas inside the substrate (called hair crack, micro crack and the like). The substrate crack causes bad influence to photoelectric conversion function such as reduction of photoproduction current as a centroid of a recombination of minority carriers, and a rise in series resistance by blocking the current passage. Many of the faults of external causes generate due to fragility of mechanical intensity and external force (including thermal warp) given to the substrate during the production process of the solar cell. Simple detection of the defect and feedback of this to the conditions of the production process so as to make improvements links directly to improvement of long-term reliability and increase in production yield rate of the solar cell. Moreover, clear analysis of whether the cause of the decrease in the photoelectric conversion function is mainly the fault of the external cause based on mechanical intensity or the fault of the internal cause based on material property can be made easily and quickly, unlike the conventional method. This as a result makes it possible to carry out a measure for improvement in the photoelectric conversion function separately for an improvement technique of the mechanical processing step and improvement technique of material property due to a reduction of impurities. This consequently allows for an effective improvement in functions and reliability of the solar cell.

Furthermore, the method of the present invention for evaluating the solar cell preferably include a judging step of judging an evaluation as good or poor based on strengths of a light emission intensity among the light emission characteristics detected in the light emission detecting step, the evaluation being judged as good when the light emission intensity is stronger than a predetermined value, the evaluation being judged as poor when the light emission intensity is weaker than the predetermined value.

Here, the "Predetermined value" can be arbitrarily set, and is not particularly limited. For example, the predetermined value may be a so-called threshold below which no sufficient photoelectric conversion performance can be attained. As an alternative, the predetermined value may be a value that is worked out in advance by averaging the light emission characteristics of solar cell elements of good quality and/or of poor quality, which are manufactured in a manufacturing factory. It is preferable to show as a table a relationship between a value of the light emission intensity and a value of the heating temperature in accordance with the threshold or the average.

Moreover, the judging step may compare a numeric value of the light emission intensity with the predetermined value. As an alternative, the judging step may use a device for directly digitalizing the light emission characteristics as a light detecting device for detecting the light emission characteristics, such as a CCD camera, and compare a digitalized value of the light emission characteristics with the predetermined digitalized value. That is, it is sufficient that the judging step is a step of judging a light emission characteristic by comparing the measured light emission characteristics with a certain predetermined reference value. As to a method to employ specifically, the judging step may employ a conventionally known technique.

By including the judging step as described above, it is possible to evaluate the performance and/or quality easily and accurately to judge whether it is good or poor.

Figure 11:
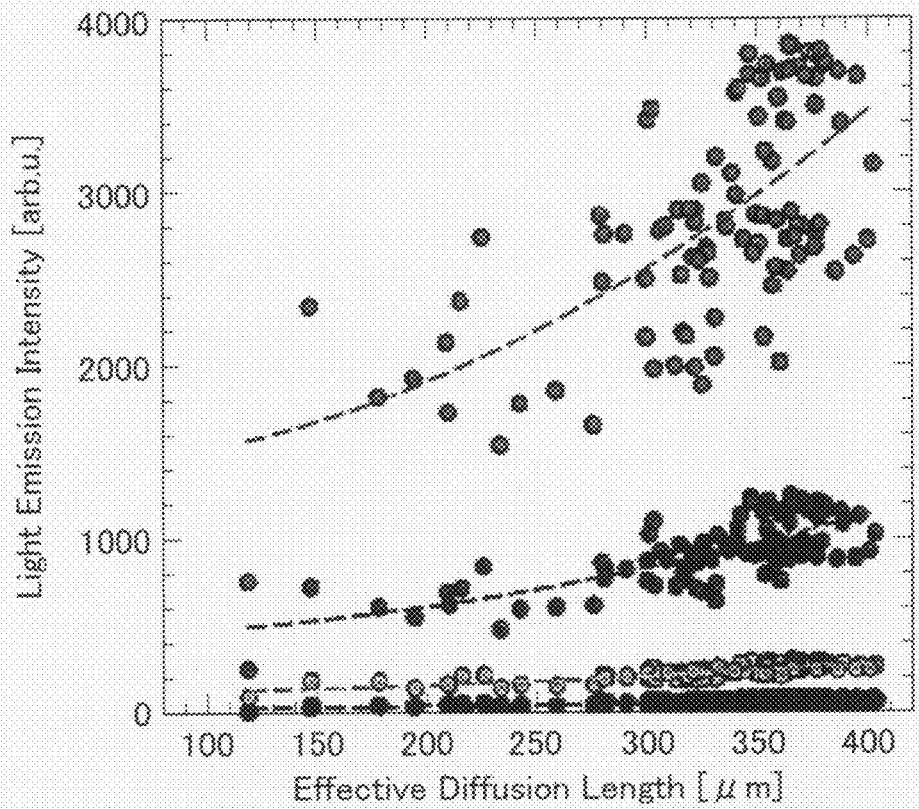
FIG. 11(a) is a view illustrating a result of analysis on a relationship between a diffusion length and a light emission intensity of an Si solar cell element.
FIG. 11(b) is a view illustrating another graph showing a result of analysis on the relationship between the diffusion length and light emission intensity of the Si solar cell element. The analysis especially examined results for the forward currents of 6 mA/cm$^2$, 13.5 mA/cm$^2$, and 18.7 mA/cm$^2$, among the results of FIG. 11(a).
Figure 11:
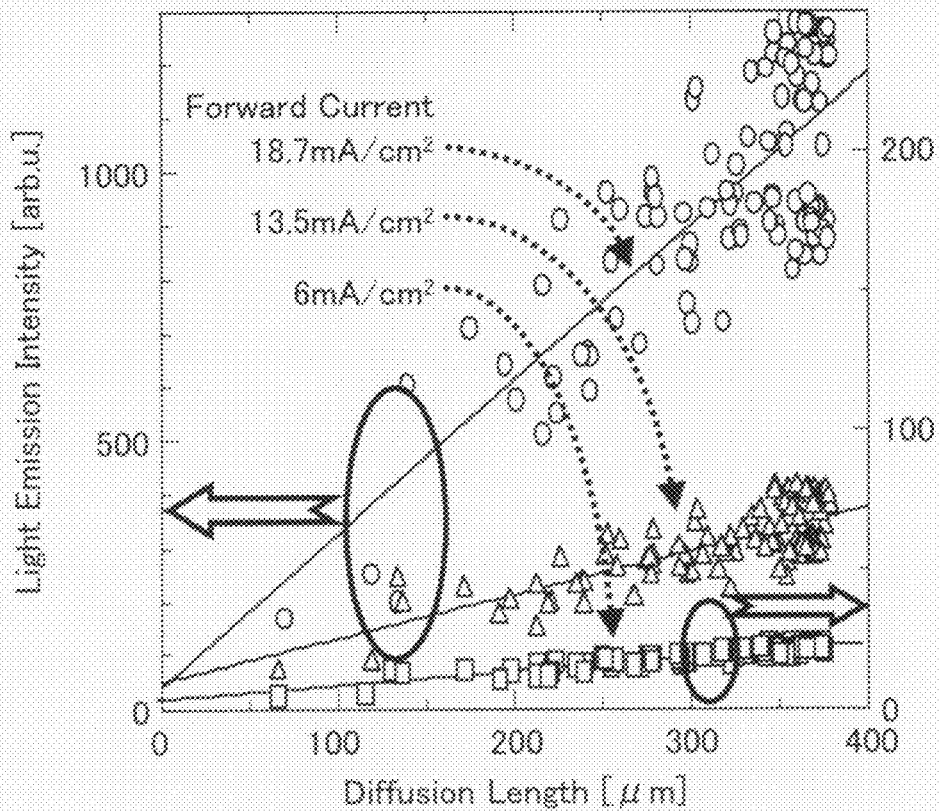

Furthermore, the method for evaluating the solar cell may include a judging step of (i) calculating a diffusion length of a minority carrier based on a light emission intensity among the light emission characteristics detected in the light emission detecting step and (ii) judging, by use of the diffusion length as an indicator, the performance of the solar cell. To describe more specifically, there is a correlation between the diffusion length of the minority carrier and a light emission characteristic (e.g., light emission intensity in FIGS. 11(a) and 11(b)), as illustrated in FIGS. 11(a) and 11(b) of examples later described. As described above, the diffusion length of the minority carrier and the performance of the solar cell element are closely related to each other.

Therefore, it is possible to evaluate the performance of the solar cell element based on that diffusion length of the minority carrier which is worked out from a light emission characteristic. One example of specific methods of working out the diffusion length of the minority carrier is to work out analogically from a graph plotting the light emission characteristic and the diffusion length of the minority carrier, as illustrated in FIGS. 11(a) and 11(b) later described. Criterion of the diffusion length of the minority carrier depends on the structure of the element and cannot be specifically defined. However, a longer diffusion length of the minority carrier is more preferable.

There is no particular limitation as to the solar cell element to be evaluated by the method for evaluating the solar cell. It is sufficient that the solar cell element is a solar cell element whose main component is a conventionally known semiconductor material. It is preferable that the solar cell element be made mainly from silicon semiconductor. The silicon semiconductor for the solar cell element is preferably monocrystalline, polycrystalline, or amorphous. In the present Description, the wording "be made mainly from" means that it may include any component or constituent other than the main component, as long as the main component is the silicon semiconductor.

Among them, it is especially preferable that the solar cell element include polycrystalline silicon semiconductor as its main component. It is difficult to attain even in-plane distribution in the solar cell element made from polycrystalline silicon semiconductor as its main component. Thus, in case of the solar cell element made from polycrystalline silicon semiconductor as its main component, it is very important to evaluate its quality and check its performance by the method according to the present invention.

Moreover, as described in Examples later described, the solar cell element made mainly from monocrystalline and/or polycrystalline silicon semiconductor intensely emits light in a wavelength ranging from 1000 nm to 1300 nm when the forward current is passed through the solar cell element. Therefore, the method of the present invention for evaluating the solar cell may be arranged such that the light emission detecting step detects the light in the region of from 1000 nm to 1300 nm especially. This arrangement makes it possible to more accurately evaluate the solar cell element made from silicon semiconductor.

Moreover, it is preferable in the current passing step that an intensity of the current to pass is substantially equivalent to that of an operating current of the solar cell element. Here, the "operating current of the solar cell element" is a current that would be actually generated by photoelectric conversion as a result of the radiation of sun light on the solar cell element to be evaluated. For example, the operating current of the solar cell element made from silicone semiconductor is in a range of 5 to 40 mA/cm$^2$, typically. The present invention, however, is not limited to this value, and the intensity of the current to pass may be appropriately varied depending on the material and composition of various types of solar cell element. Moreover, any rational values out of the above numerical range are included in the technical scope of the present invention, provided that the effect of the present invention can be attained with the value.

Figure 16:
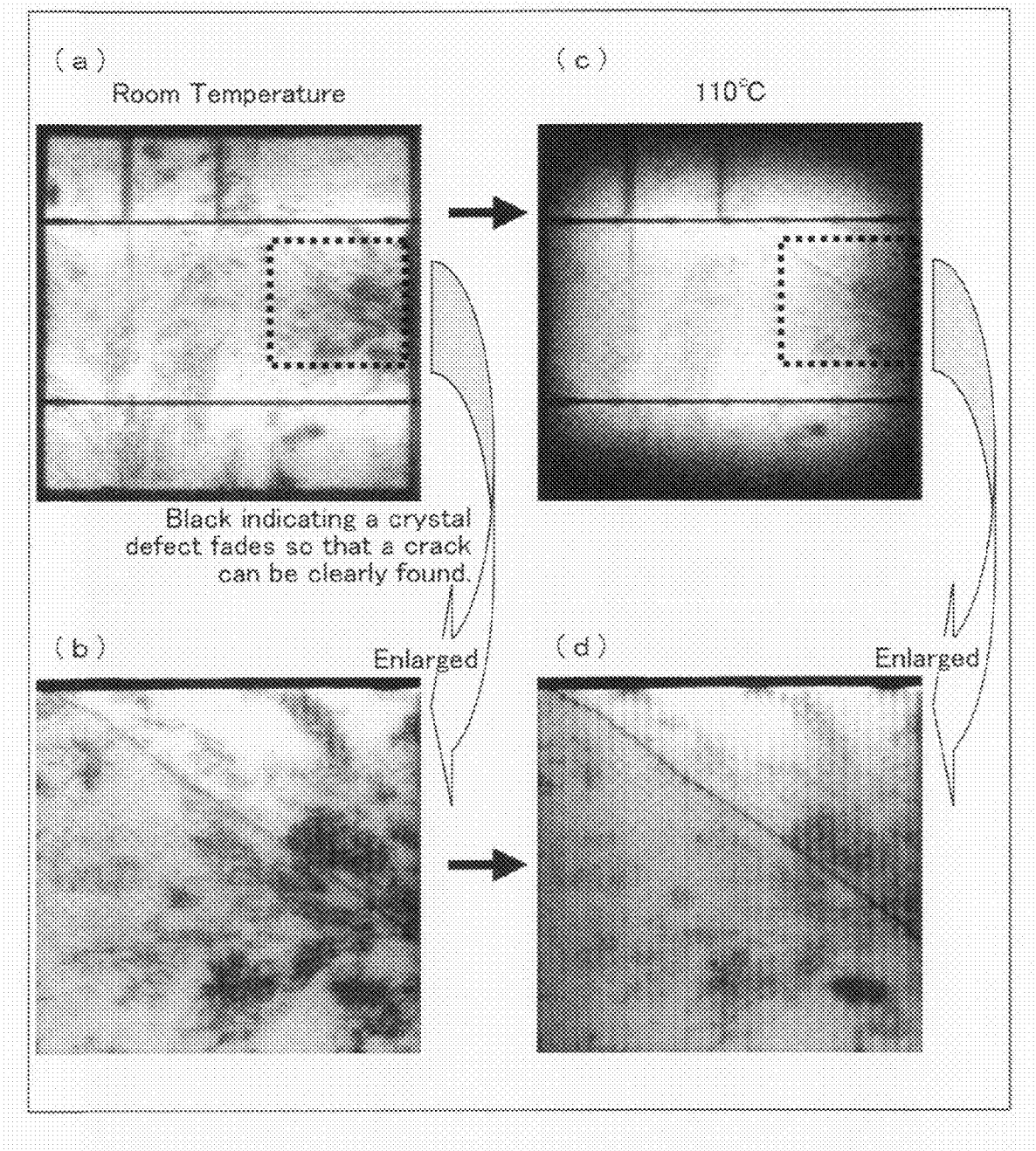
FIG. 16 is a view of images picturing a state of a crystal defect (internal cause defect) and a substrate crack (external cause defect) when a temperature given to an Si solar cell element is varied, wherein (a) illustrates a state of the internal and external cause defects at room temperature, (b) illustrates an enlarged view of a section indicated by broken lines in (a), and (c) and (d) illustrate a state of (a) and (b) when the temperature given to the Si solar cell element is 110° C.

It is preferable that the heating temperature to be applied to the solar cell elements or the solar cell module in the temperature control step inclusively ranges from room temperature to 130° C. As illustrated in FIG. 16 of the Example, the internal cause defect dependent on the temperature change significantly appears when the temperature of the solar cell is at room temperature, however when the temperature is risen, the defect becomes indistinct. On the other hand, the external cause defect not dependent on the temperature change appears in a high temperature area.

By performing the evaluation under actual operating conditions, it is possible to detect defects of the solar cell element with the defects categorized respectively, thereby evaluating the performance more accurately.

Albeit the method of the present invention for evaluating the solar cell is described referring to the solar cell module assumed to form by linking a many number of solar cell elements in series, a solar cell module formed by linking a many number of solar cell elements in parallel can be evaluated in such a manner that each portion of the solar cell module in which the solar cell elements are linked in series is evaluated individually.

The present invention may be arranged such that, for example, spectrum distribution measurement using a band pass filter or the like, or detailed spectrum measurement using a spectrometer may be carried out, apart from directly measuring the luminescence intensity by using, for example, a CCD camera after the forward current is passed through the solar cell element, and then results of these measurements are analyzed in a comprehensive manner. Especially, comprehensive analysis with absolute measurement of the diffusion length at a multi-wavelength spectrum sensitivity makes it possible to analyze distribution of the absolute values. In this case, the present invention is characterized in not using probe light unlike a conventional art.

As described above, the method of the present invention for evaluating the solar cell makes it possible to evaluate the photoelectric conversion performance of the solar cell element easily and accurately without requiring a large-sized facility unlike the conventional method for evaluating the solar cell. More specifically, the method and apparatus according to the present invention for evaluating the solar cell utilize the electroluminescence in which the forward current is passed through. Thus, the method and apparatus according to the present invention are advantageous over the conventional art, for example, in (i) it is not necessary to use a scanning probe (electron beam, laser), thus the measurement can be done easily, (ii) a large facility is not necessary, thus it is possible to observe and evaluate the solar cell as a product (as a product completed in the manufacturing factory or as a product implemented on a construction), (iii) it is possible to evaluate the solar cell under actual operation condition (the condition under the sun light radiation is equivalent to passage of a current of 5 to 40 mA/cm$^2$), (iv) it is possible to perform more detailed physical analysis by spectrum analysis, (v) it is possible to judge and detect the internal cause defect and the external cause defect, and the like.

Furthermore, the method and apparatus according to the present invention can easily further include light emission analysis using backward voltage or under high electric field application. This makes it possible to integrally evaluate the property of the minority carriers and the performance of the element due to the property of the minority carriers.

Moreover, the method according to the present invention for evaluating the solar cell may be arranged such that the current passing step includes changing the intensity of the current passed through and the light emission detecting step includes detecting how the light emission characteristic of the light from the solar cell element is changed according to the change in the intensity of the current, and the method further includes calculating a diode factor of the solar cell element from the change in the intensity of the current and the change in the light emission characteristic.

In this arrangement, it is preferable that a range of the change in the intensity of the current be within the actual operation conditions (for example, in a range of 5 to 40 mA/cm$^2$).

Figure 20:
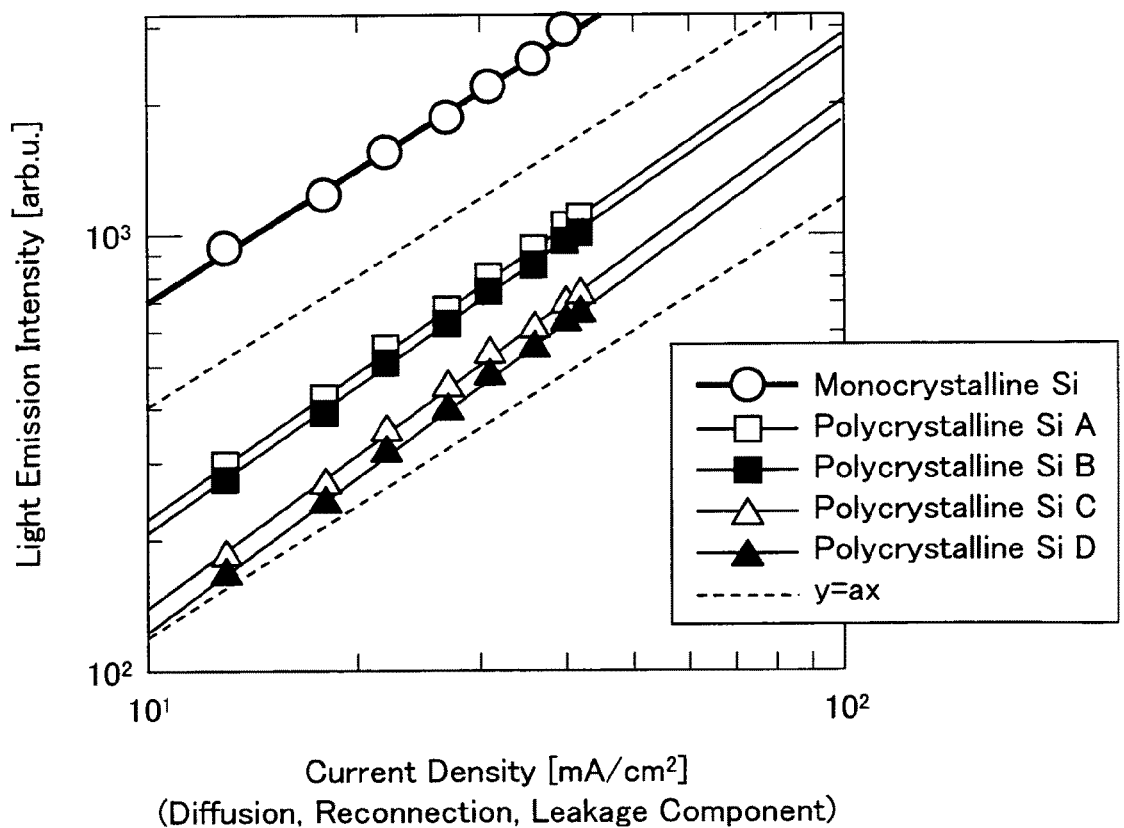
FIG. 20 is a view illustrating a result of analysis on a change in light emission intensity (EL intensity) against a change in current density in solar cell elements respectively made from monocrystalline silicon and polycrystalline silicon.

In this method, as illustrated in FIG. 20 of the below-explained embodiment for example, a specific method for calculating the diode factor is plotting the change in the light emission characteristic (e.g., the light emission intensity of the light, or the like) against the change in the intensity of the current (current density [mA/cm$^2$]) to draw a logarithmic graph (whose x axis is the change in the intensity of the current, and y axis is the change in the light emission characteristic). In this case, the gradient of the graph is the diode factor of the solar cell element.

It is known that the diode factor closer to "1" indicates formation of more ideal pn junction and is more advantageous in energy conversion efficiency. Thus, it is possible to judge that the performance of the solar cell element is good when the gradient of the graph is close to "1". Meanwhile it is possible to judge that the performance is poor when the gradient is increased from "1" (i.e., it get greater than "1"). That is, the evaluation method may further include evaluating the performance of the solar cell referring to whether the diode factor is close to "1" or not. In the above explanation, the ideal "diffusion current" component is "1", and the gradient increases when another component (recombining current component or the like) is mixed in. For example, the gradient becomes "2" when the mixing component is the recombining current.

Moreover, it was confirmed experimentally as described in the later-described Example that a greater light emission intensity of the light got the gradient of the graph closer to "1". Moreover, it was confirmed that the diffusion current became dominant and thereby the gradient became substantially "1" when the solar cell element was made from monocrystalline silicon semiconductor, and that the influence from the other current components became greater when the solar cell element was made from polycrystalline silicon semiconductor.

Moreover, the method of the present invention for evaluating the solar cell may adopt a method other than these described above, in order to compare the measured value with a reference sample so as to judge whether the performance is good or poor. More specifically, for example, the method of the present invention for evaluating the solar cell may be carried out with the reference sample so as to obtain the result of evaluation of the reference sample, and then compare, with the result of evaluation of the reference sample, the result of the evaluation of the solar cell to be evaluated. This makes it possible to easily and surely evaluate the performance of the solar cell to be evaluated.

Moreover, the evaluation method according to the present invention can evaluate quantitatively as well as qualitatively. For example, the evaluation method according to the present invention can evaluate the performance of solar cell qualitatively by checking whether the light emission intensity of the light is strong or weak. Meanwhile, the evaluation method according to the present invention can evaluate the performance of solar cell quantitatively by digitalizing the light emission characteristic of the solar cell element, and accurately analyzing the numerical information and positional information of the solar cell element. As to specific methods for such quantitative evaluation, a person skilled in the art should be able to easily implement an appropriate one based on the content of the present Description and the technical general knowledge as of the filing of the present application.

<2. Apparatus for Evaluating Solar Cell>

The apparatus of the present invention for evaluating the solar cell is an apparatus for evaluating the solar cell in terms of the photoelectric conversion performance thereof. It is sufficient that the apparatus include a current passing section (current passing means) for passing a direct current in the forward direction through the solar cell element constituting the solar cell, and light detecting means for detecting the light emission characteristic of the light emitted from the solar cell element by the passage of the current by the current passing section. The apparatus is not particularly limited in terms of other specific arrangement, size, shape, etc.

The current passing section is not particularly limited in terms of its specific arrangement etc., provided that it can apply a so-called direct bias on the solar cell element in order to pass the direct current therethrough in the forward direction. In the other words, the current passing means should be a means for carrying out the "current passing step" described in the item <1>. For example, the current passing section may be a conventionally known constant current source, constant voltage source, or the like.

Moreover, it is preferable that the current passing section pass, through the solar cell element, a current substantially equivalent to the operating current of the solar cell element.

The light emission detecting section is not particularly limited in terms of its specific arrangement etc., provided that the light emission detecting section is a means for detecting the light emission characteristic of the light emitted from the solar cell element when the forward bias is applied on the solar cell element. That is, the light emission detecting section should be a means for carrying out the "light emission detecting step" described in the item <1>. For example, a conventionally known light detector such as CCD camera or image intensifier may be suitably used. The term "light emission characteristics" used here means the same as the term used above.

In the other words, the apparatus of the present invention for evaluating the solar cell is an apparatus for carrying out "the method for evaluating the solar cell" described in item <1> above.

The apparatus of the present invention for evaluating the solar cell is not particularly limited in terms of what it evaluates. Thus, the apparatus of the present invention for evaluating the solar cell is applicable to general solar cells made from semiconductors. Of all, it is preferable that the apparatus of the present invention be used to evaluate a solar cell including silicon semiconductor as its main component. In the case of the solar cell element in which silicon semiconductor is used, emission of light especially in a range of 1000 nm to 1300 nm is observed. In this case, therefore, it is preferable that the light emission detecting section be capable of detecting the light in this wavelength region (near-infrared region).

Moreover, it is preferable that the device according to the present invention for evaluating the solar cell further includes a temperature control section (temperature control means) for controlling a heating temperature of the solar cell elements or the solar cell module.

Specific arrangements and the like of the temperature control section are not particularly limited, as long as a heating temperature is controlled of the solar cell elements or the solar cell module. That is to say, the temperature control section is satisfactory as long as the "temperature control step" described in item <1> is carried out. By including the temperature control section, separate detection of the external cause defect and the internal cause defect by the light emission detecting section is possible.

Furthermore, the apparatus of the present invention for evaluating the solar cell preferably include a judging section (judging means) for evaluating the solar cell by using, as an indictor, strengths of a light emission intensity among the light emission characteristics detected by the light emission detecting section, the judging section judging the solar cell as good when the light emission intensity is above a predetermined value, and the judging section judging the solar cell as poor when the light emission intensity is below a predetermined value. The judging section is not particularly limited in terms of its specific arrangement, provided that it can perform the "judging step" described in item <1>. For example, an arithmetic unit of a computer, or the like conventionally known may be the judging section suitably. Note that, the term "predetermined value" means the same as that used in item <1>. So, its explanation is omitted here.

Moreover, the apparatus of the present invention for evaluating the solar cell may be provided with a scanning section (scanning means) that is a system capable of performing 2-dimensional scanning, in addition to 1-dimensional scanning system, such as line scanner. With an apparatus of the present invention provided with such a scanning section, a whole large-sized solar cell module including many solar cell elements can be evaluated while being scanned. The scanning section may be included in the apparatus for evaluating or provided on the solar cell element to be evaluated. Meanwhile, it is possible to perform the evaluation without scanning. For example, the whole solar cell module may be evaluated at once by observing from above the solar cell element, or may be evaluated only partially.

Moreover, the apparatus of the present invention for evaluating the solar cell may further include a judging section (judging means) for calculating out a diffusion length of the minority carriers from the light emission intensity among the characteristics detected by the light emission detecting section, and evaluating the performance of the solar cell module by using the diffusion length as an indicator. In the other words, the judging section is a judging means for performing the judging method described in item <1>. See item <1> for what this means performs specifically.

Moreover, the apparatus of the present invention for evaluating the solar cell may be arranged such that the current passing section changes the intensity of the current to be passed through, the light emission detecting section detects how the light emission characteristic of the light emitted from the solar cell element is changed according to the change in the intensity of the current caused by the current passing section, and the apparatus includes a calculating section (calculating means) for calculating a diode factor of the solar cell element based on the change in the intensity of the current and the change in the light emission characteristic. Again, the calculating section should be a calculating means for performing the evaluating method described in item <1>, and an arithmetic device conventionally known or the like may be adopted suitably. See item <1> for what the calculating section performs specifically. In the other words, the evaluating apparatus may include the evaluation section for evaluating the performance of the solar cell referring whether the diode factor is close to "1" or not.

Needless to say, the description regarding the method of the present invention for evaluating the solar cell in item <1> can be referred for and applied to the apparatus for evaluating the solar cell in terms of matters other than these described above.

Figure 3:
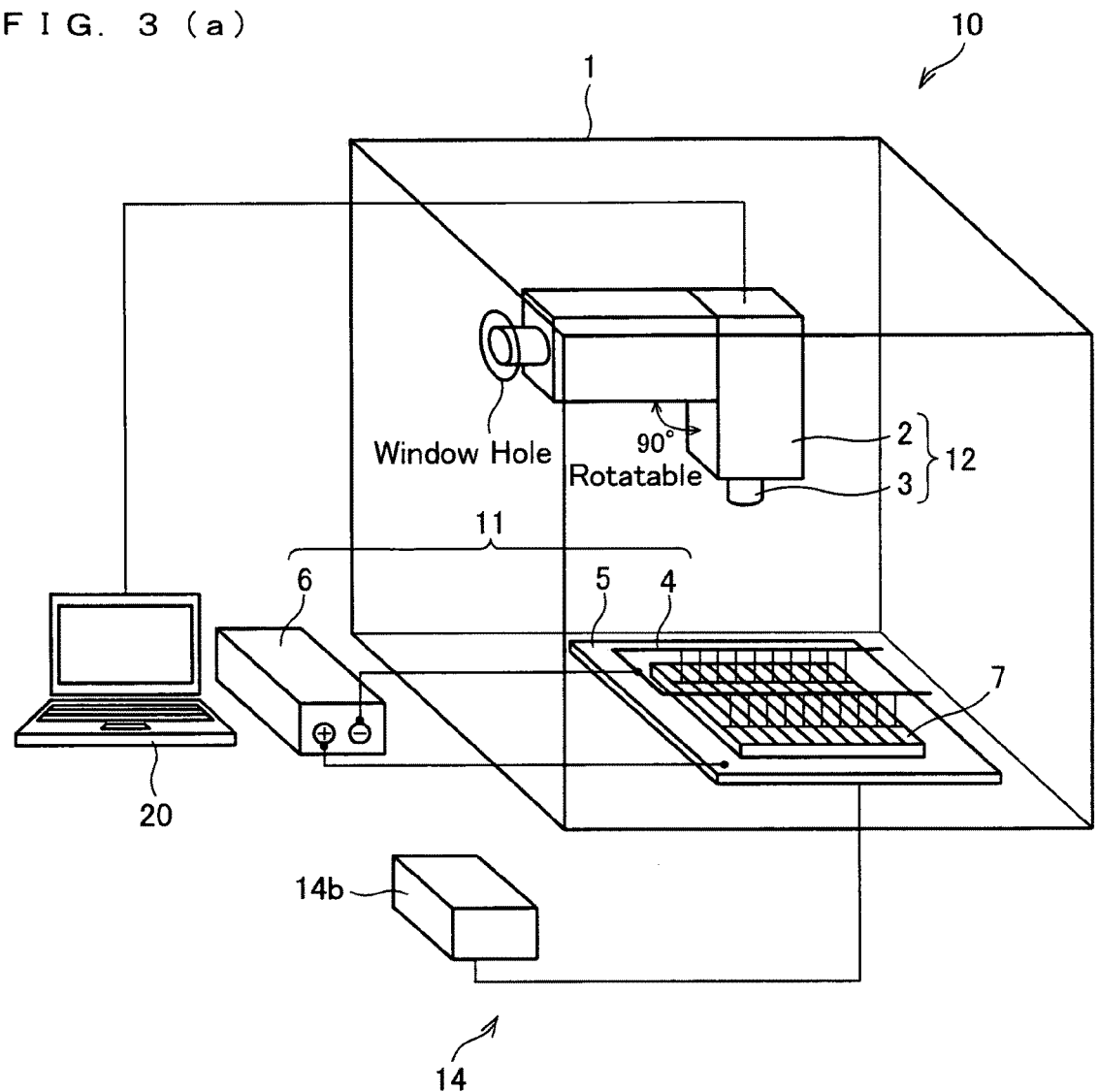
FIG. 3($a$) is a view schematically illustrating one example of an apparatus according to a present embodiment for evaluating a solar cell.
Figure 3:
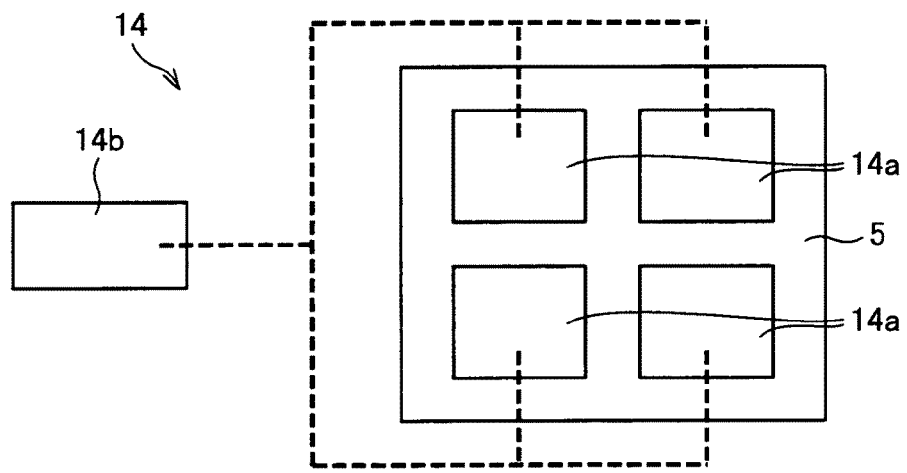

Next, one embodiment of the apparatus of the present invention for evaluating the solar cell is described below referring to FIG. 3(a). As illustrated in FIG. 3(a), an evaluating apparatus 10 according to the present embodiment for evaluating a solar cell includes a black box 1, a light emission detecting section 12, a temperature control section 14, a comb-shaped probe 4, a copper plate 5, a direct current power supply 6, and a judging section 20. Moreover, a solar cell element 7 is to be evaluated here. The solar cell element 7 is arranged by linking a plurality of solar cell elements. Instead of the solar cell element 7, a module formed by linking a plurality of solar cell elements may be evaluated here.

The black box 1 is provided to from a dark condition for easy detection of the light emission characteristic of the solar cell element 7. The black box 1 has a window hole that is utilized in evaluating a solar cell module or panel that is set up in a perpendicular direction.

The light emission detecting section 12 functions as light detecting means including a CCD camera, and includes a cooled CCD (−50° C.) 2 and a lens 3. The light emission detecting section 12 is 90° rotatable to make it possible to evaluate the solar cell module that is set up in the perpendicular direction. Moreover, the lens may be a normal lens or zoom lens.

Moreover, in a case in which a cell (solar cell element) constituting solar cell elements 7 in different sizes are evaluated by using a CCD camera as the light emission detecting section 12, it is possible to use a CCD camera having the following capabilities shown in Table 1.

TABLE 1

| CCD Camera |
| ~For Picturing cells in different sizes~ |
| Effective Element Size: 12.29 × 12.29 mm |

| Normal Picturing Mode |
| Lens |

| Capable of picturing the whole by picturing cell by cell. |
| Picturing Ranges: approx. 15 × 15, 25 × 25, |
| 110 × 110, 160 × 160, 210 × 210 mm |
| Zooming |

| Capable of zooming each cell |
| Minimum Picturing Range: 0.1 × 0.1 mm |
| Maximum Picturing Range: 210 × 210 mm |
| Movable in X and Y axes |

| Capable of moving in X and Y-axis directions while zooming |
| Maximum Movable Ranges: approx. 210 × 210 mm |
| Module Picturing Mode |

| 90° Rotation |
| Capable of Picturing Module (1200 mm × 800 mm) |
| Distance between Module and Lens: approx. 3 m |
| Pictures Module placed out of Black Box. |

More specifically, in the normal picturing mode, the picturing is carried out with the CCD camera positioned to be above the solar cell element as illustrated in FIG. 3(a). Meanwhile, in the module picturing mode, the solar cell module placed out of the black box 1, and the CCD camera is rotated 90° to picture and measure the solar cell module.

The sizes (cell sizes) of the solar cell element 7 to be evaluated in the normal picturing mode may be, for example, approximately 10×10, 20×20, 100×100, 150×150, 160×160, or 200×200 mm in dimension, and 0.3 mm or less in thickness.

Moreover, in the present embodiment, it is preferable that the distance between the lens 3 of the light emission detecting section 12 and the solar cell element 7 be set to be 150 mm or more but 400 mm or less, and that the light emission detecting section 12 be movable up and down in the distance between the light emission detecting section 12 and the solar cell element 7.

The temperature control section 14 includes a heater section 14a which heats the solar cell elements 7 and a control section 14b which controls the heating temperature that is changeable in a range of room temperature to 130° C. FIG. 3(b) is a view schematically illustrating an arrangement of the temperature control section 14. As illustrated in FIG. 3(b), a conventionally known Peltier device is used in the heater section 14a. The Peltier device is arranged so as to be attached to a back surface of the copper plate 5. Material to be used in the heater section 14a is not limited to the Peltier device, and may be, for example, a tape heater or the like.

The comb-shaped probe 4 is surface contacts for applying the current on the solar cell element 7. The comb-shaped probe 4 includes a pair of comb-shaped probes, as illustrated above. One tooth of the comb shape corresponds to one electrode of the solar cell element constituting the solar cell element 7. The probe with a comb-shaped structure can apply the current evenly on the solar cell element 7, and thus is preferable.

Especially, the comb-shaped probes for 100×100, 150× 150, and 200×200 mm cells may be arranged to be different in a length and an electrode-electrode width of each pass bar electrode. For example, a pair of comb-shaped probes made by Atto System Corp. In this case, it is preferable that a distance between the two comb-shaped probes be adjustable. Furthermore, there is no particular limitation as to the distance between the "tooth" of the comb-shaped probes. For example, the distance between the "tooth" of the comb-shaped probes may be 9 mm. Moreover, the teeth of the comb-shaped probes may be 1 mm in width. Moreover, it is preferable to use one comb-shaped probe per one electrode.

For the solar cell element of 10×10 mm or 20×20 mm, it may be arranged such that a probe from a positioner is used instead of using the comb-shaped probe.

Moreover, the copper plate 5 functions as a reverse contact. For example, the copper plate 5 may be a gold-plated copper plate. In this case, it is preferable to suck the solar cell element 7 overall. To encounter a consequent change in the cell size, square drains centered at the same center may be provided so as to perform the suction more stably. Dimensionwise, the drains may be, for example, 8×8 mm, 18×18 mm, 98×98 mm, 148×148 mm, and 195×195 mm. Moreover, it is preferable to provide a temperature sensor and a cooling device. This can make it possible to keep a temperature of the solar cell element so as to improve accuracy in the measurement and evaluation.

The direct current power supply 6 may be a normal DC power supply (1 mA/cm$^2$ to 50 mA/cm$^2$). The voltage may be in the order of 5V for evaluating the solar cell element or the solar cell module. However, a voltage in the order of 100V is preferable for evaluating the solar cell module formed by linking a plurality of the solar cell elements.

Moreover, the comb-shaped probe 4, copper plate 5, and the direct current power supply 6 function as a current passing section 11. The comb-shaped probe 4 is connected to the negative side of the direct current power supply 6 and the copper plate 5 is connected to the positive side thereof.

The judging section 20 functions as the judging means for evaluating the performance of the solar cell element 7. In the present embodiment, an image processor is employed as the judging section 20. There is no particular limitation as to software to use, provided that the object of the present invention can be achieved. The following is one preferable example of a structure of the software.

Capable of storing a 8-bit image (28=256 gray scales) or 16-bit image (216=65536 gray scales).

Capable of acquiring and storing luminance profile data of an area selected on a screen after detecting (picturing) the light emission characteristics of the solar cell element.

Capable of dealing with spectrum.

Capable of acquiring highly-sensitive image (image intensifier camera), e.g., capable of measuring emission at a reverse current application.

Furthermore, it is preferable to have the following arrangements.

improved in that an image obtained from data read by a spreadsheet software is rotated 90° to the pictured image.

Capable of easily switching to a beginning mode.

Programmed to automatically create a histogram of the light emission intensity of the light.

Automatically measures a length and weight of a portion having low light emission intensity of the light (i.e. a dark portion). Automatically measures dark portions of 1 cm or greater in size.

Calculates an average of the intensities of the light emission in a selected range (preferably being capable of measuring an average of the intensities with grid portions omitted).

Inside the black box 1, the light emission detecting section 12, the comb-shaped probe 4, the copper plate 5, and the solar cell element 7 are disposed. The light emission detecting section 12 is positioned to be able to detect the light emission characteristics of the solar cell element 7. In the present embodiment, the light emission detecting section 12 is disposed above the solar cell element 7.

An evaluation operation of the evaluating apparatus 10 for evaluating the solar cell is described here. To begin with, the current passing section 11 passes a current through the solar cell element 7 constituting the solar cell module. Further, the temperature control section 14 heats the solar cell element 7. Accordingly the solar cell element 7 emits light by the current passed from the current passing section 11 and light emission characteristics of the solar cell element 7 changes according to the heating temperature. The light emission detecting section 12 detects the light emission characteristic (light emission intensity in the case of the present embodiment) of the solar cell element 7, thereby detecting a defect of the solar cell element 7. The light emission detecting section 12 and the judging section 20 are connected with each other so as to send to the judging section 20 the result of the detection obtained by the light emission detecting section 12. Finally, the judging section 20 evaluates the performance of the solar cell element constituting the solar cell element 7 from the result of the detection. Note that, the heating temperature can be changed by the temperature control section 14, so that it is possible to specify a type of the defect in the solar cell element 7.

As described above, it is possible to easily and surely perform the method for evaluating the solar cell described in item <1>, according to the apparatus of the present invention for evaluating the solar cell. In this case, a large-sized and complicated apparatus like the conventional evaluating apparatus is not required, but it is possible to evaluate the performance of the solar cell element accurately with a simple apparatus.

It should be noted that the present invention is not limited to the above description in which the apparatus and method for evaluating the solar cell element and the solar cell module are explained. The present invention is also applicable to evaluation of a solar cell panel formed by linking a plurality of the solar cell modules. In this case, the intensity of the current to apply, voltage, the shape of the probe, etc. can be modified if necessary. For example, it may be arranged such that the forward current is equivalent to a total current of currents in a range of 1 to 80 [mA/cm$^2$] per solar cell element. Moreover, a dark room may be used in replacement of the black box according to the size of the solar cell module. Moreover, as described above, the light emission detecting section 12 in FIG. 3(a) may be rotated 90° to picture a solar cell module that is set up in a perpendicular direction.

<3. Usage>

As described above, the method and apparatus of the present invention for evaluating the solar cell do not need a large-sized facility and can evaluate the photoelectric conduction performance of the solar cell module easily and accurately, compared with the conventional method and apparatus for evaluating the solar cell.

Furthermore, it is possible to establish a business model such as a maintenance method and a maintenance system for regularly evaluating a solar cell implemented on a construction, because, for example, the method and apparatus of the present invention for evaluating the solar cell do not need, e.g., a scanning probe (electron beam, laser) and thus are able to perform easier measurement, compared with the conventional art. Moreover, the lack of the need of the large-sized facility makes it possible to observe and evaluate the solar cell as a product (as a product completed in the manufacturing factory or as a product implemented on a construction). Because of these and other advantages, it is possible to establish a business model such as a maintenance method or a maintenance system in which a solar cell implemented on a construction is evaluated on a regular basis.

That is, the present invention encompasses a method for performing maintenance of a solar cell, the method including the above-described evaluating apparatus evaluating a solar cell module implemented on a construction, the judging means judging, based on a result of the evaluation on the solar cell module, whether or not the solar cell module has a solar cell element whose performance is lower than a predetermined value, and replacement instructing means instructing, via a communication network, a solar-cell-element-replacing party to replace the solar cell element whose performance is lower than the predetermined value.

Furthermore, the present invention encompasses a maintenance system for performing the maintenance method. The maintenance system according to the present invention at least includes the evaluating apparatus as described above, the judging device for judging, based on a result of the evaluation performed by the evaluating apparatus, whether or not the solar cell module implemented on the construction has a solar cell element whose performance is lower than a predetermined value, and a replacement instructing device for instructing, via a communication network, a solar-cell-element-replacing party to replace the solar cell element whose performance is lower than the predetermined value.

In the present Description, what is meant by the wording "solar cell module implemented on a construction" is a solar cell module that is already implemented on a construction such as residential facilities such as living houses, condominiums etc., business facilities such as shopping malls, office buildings, etc., or the like. For example, extruded from the "solar cell module implemented on a construction" is a solar cell that is being produced or is just produced in the manufacturing factory of the solar cell module, and that is not implemented on any construction.

Figure 4:
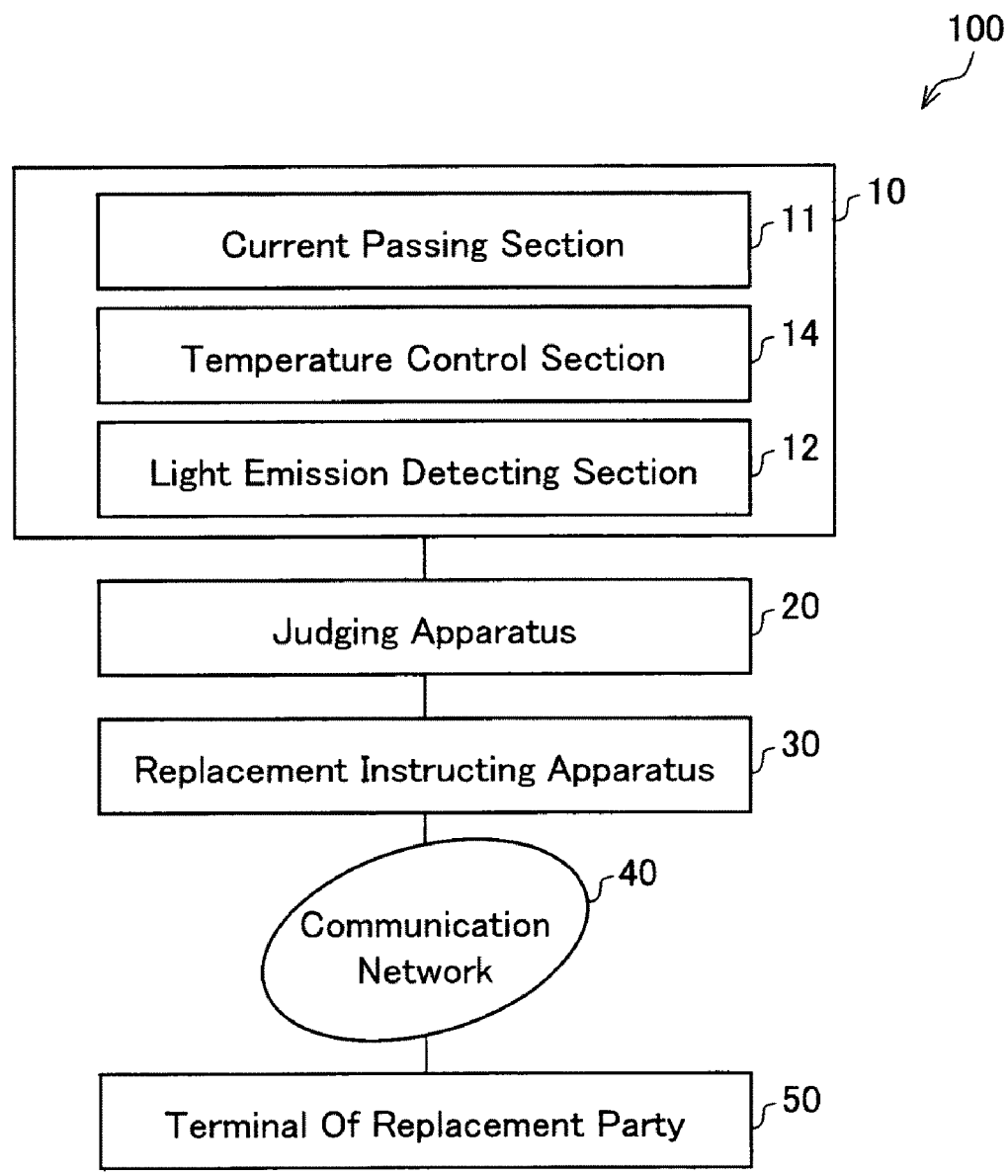
FIG. 4 is a functional block diagram schematically illustrating one example of a maintenance system according to the present embodiment.

FIG. 4 illustrates a functional block diagram schematically illustrating one example of the maintenance system according to the present embodiment. As illustrated in FIG. 4, a maintenance system 100 according to the present invention includes an evaluating apparatus 10, a judging device 20, and a replacement instructing device 30. The evaluating apparatus 10 includes a current passing section 11, a light emission detecting section 12 and a temperature control section 14. The replacement instructing device 30 is connected to a terminal 50 of a replacement party via the communication network 40. The communication network 40 and/or the terminal 50 of the replacement party may be included in the maintenance system or may be a given external network or a given terminal.

The current passing section 11, the light emission detecting section 12, and the temperature control section 14 carry out the current passing step, the light emission detecting step, and the temperature control step, respectively.

The judging device 20 has a function of judging, based on the result of the evaluation performed by the evaluating apparatus 10, whether or not the solar cell module implemented on the construction has a solar cell element whose performance is lower than the predetermined value. The judging device may be a conventionally known arithmetic unit such as a computer, or the like.

The replacement instructing device 30 has a function of instructing, via the communication network, the replacement party for the solar cell element to replace the solar cell element whose performance is lower than the predetermined value.

Needless to say, one computer may function as the judging device and the replacement instructing device, while the present embodiment is arranged such that the judging device 20 and the replacement instructing device 30 are individual devices.

Moreover, the communication network 40 may be a wired leased line or a communication line such as the Internet or the like. Moreover, the communication network 40 may be a network using a portable phone line or a wireless line.

The terminal 50 of the replacement party may be any terminal, provided that it can recognize the replacement instruction from the replacement instructing device 30. It is preferable that the terminal 50 be provided with a display section (e.g., a display such as CRT or LCD), or an output section (e.g., a printer).

Figure 5:
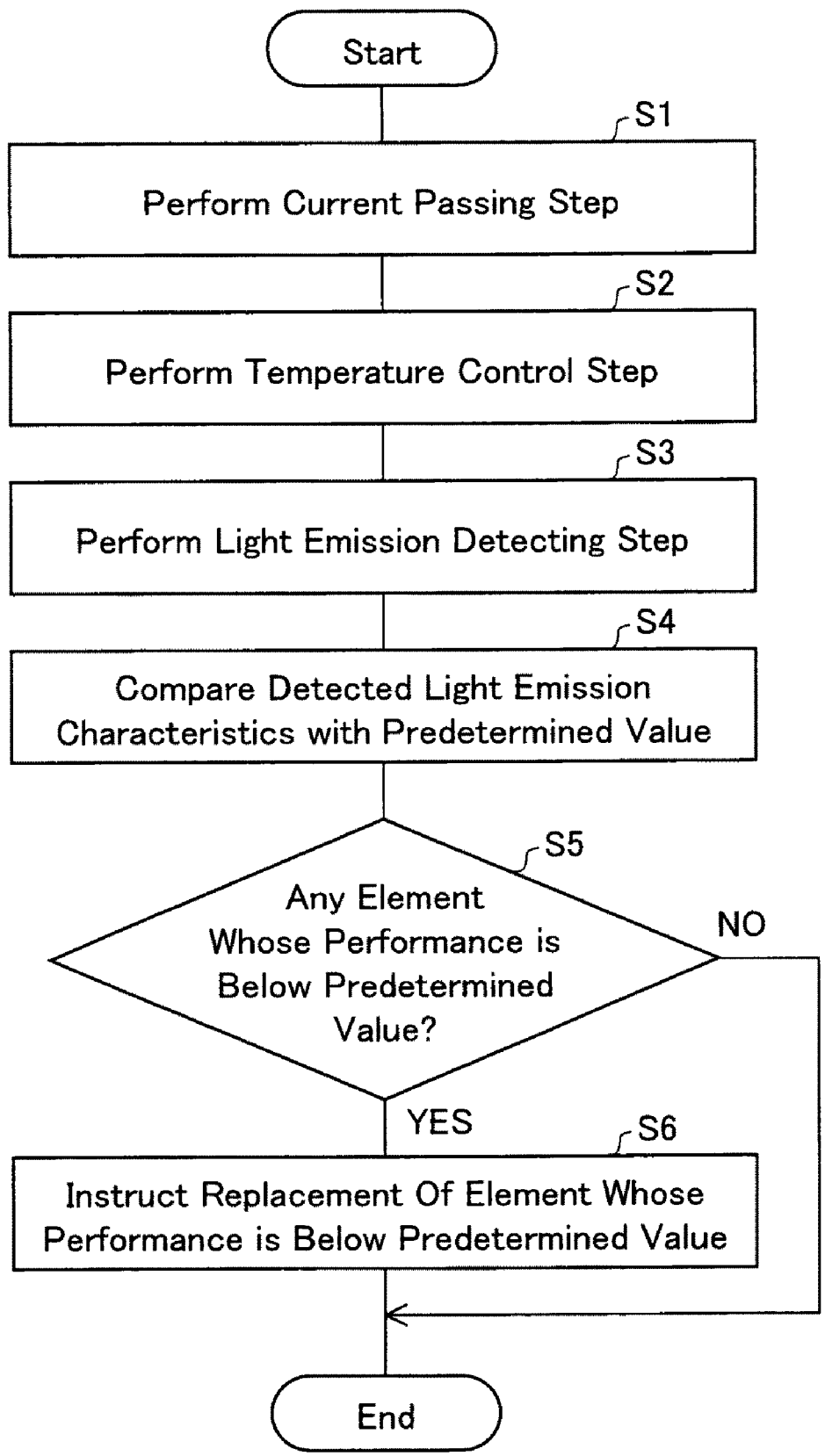
FIG. 5 is a view illustrating one example of a flow of a maintenance system according to the present embodiment.

FIG. 5 illustrates one example of a flow of the maintenance system according to the present embodiment. As illustrated in FIG. 5, in the maintenance system 100, the current passing section 11 of the evaluating apparatus 10 performs the current passing step on the solar cell module that is a target of the maintenance (Step 1, the step will be abbreviated as "S" hereinafter). Next, the temperature control section 14 of the evaluating apparatus 10 performs the temperature controlling step of heating the solar cell module (S2). Then, the light emission detecting section 12 of the evaluating apparatus 10 detects a light emission characteristic of the light emitted from the solar cell module due to the process in S1 (S3).

Next, the judging device 20 judges, based on the result of the detection performed by the light emission detecting section 12, whether the solar cell module implemented on the construction has a solar cell element whose performance is lower than a predetermined value (S4). Then, if the judging device 20 judges at S5 that the solar cell module implemented on the construction has a solar cell element whose performance is lower than a predetermined value ("Y"), the process goes to S6. At S6, the replacement instructing device 30 communicates the terminal 50 of the replacement party via the communication network 40 so as to instruct the replacement of the solar cell element whose performance is lower than a predetermined value. Then, the process is terminated.

By contrast, if the judging device 20 judges at S5 that the solar cell module implemented on the construction dose not have a solar cell element whose performance is lower than a predetermined value ("N"), the process is then terminated.

As described above, the maintenance method or maintenance system according to the present invention for solar cell do not need a large-size apparatus and can easily evaluate the solar cell in quality with a simple evaluating apparatus. Thus, it is possible to regularly perform maintenance for a solar cell module implemented on a construction. This allows the quality of the solar cell module to be kept at a certain level.

As discussed above, the conventional evaluation of the solar cell requires a large-sized apparatus.

Accordingly, it has been impossible to evaluate such a solar cell module implemented on a construction such as houses etc., and to perform maintenance of such an implemented solar cell on a regular basis. By contrast, the present invention does not require a large-sized apparatus unlike the conventional art. Thus, the present invention firstly makes it possible to evaluate the performance of the solar cell implemented on a construction.

Moreover, as described above, the conventional performance evaluation using the solar simulator examines the photoelectric conversion efficiency of the whole solar cell module, and cannot perform a detailed analysis to find out a solar cell element of which position in the module has a poor conversion efficiency. Thus, if it was found out that the performance of the solar cell module was deteriorated, it would be necessary to replace all the solar cell module very wastefully.

By contrast, the present invention makes it possible to judge at one sight, by using a light emission characteristic as an indicator, which solar cell element is poor in performance among many solar cell elements constituting the solar cell module. Thus, it is not necessary to replace all the whole solar cell module, and only the solar cell element whose performance is poor can be replaced very efficiently.

The following description explains one example of a product examination method carried out when producing the solar cell module. FIG. 6 is a view of an image picturing a state of a solar cell module of a size 0.7 m×1 m. Note that an enlarged image of a part of a solar cell element which is included in the solar cell module is illustrated on the left bottom side of FIG. 6. As illustrated in FIG. 6, continuous monitoring of the light emission characteristic of the solar cell module in the production step of the solar cell module allows detection of the internal and external cause defects. Therefore, repair and replacement of just a part that has the defect is possible. As such, the evaluation device of the present invention incorporates the examination of the solar cell module in the production step of the solar cell module. This automatically enables a total inspection, which as a result allows providing a solar cell module that has no defect.

The photovoltaics for generating an electric energy from affluent sun light by using the solar cell has been dramatically advanced technically in recent years to be employed as a usually-used power generating method. It is expected that photovoltaics will be prevailed as a clean energy in full scale to save the 21st century human civilization from fossil energy pollution.

The photovoltaics utilizes sun radiation energy that is exhaustless and "free". Apart from that, the photovoltaics do not have a moving part because thermal energy does not mediate the photovoltaics that uses a quantum photoelectric effect in semiconductor. Thus, the photovoltaics is regarded as a "quite, safe, and non-polluting" way to obtain electric energy. Despite of such advantages, the solar cells requires quite expensive silicon or the like of high purity, resulting in needs high cost in power generation thereof. This is one big reason why the solar cells has not been so popular yet. It has been one reason for the high cost that the expensiveness thereof makes it practically impossible to replace the whole solar cell even if its performance becomes poor, and thus there is no appropriate maintenance method for the implemented solar cell module.

However, the maintenance method and maintenance system according to the present invention for performing maintenance of the solar cell makes it possible to easily perform the maintenance of the implemented solar cell module as described above. Therefore, the present invention is applicable not only to the product inspection in the production of the solar cell module but also to the maintenance thereof, thereby contributing to popularizing the solar cell module. As such, the present invention is not only industrially applicable but also very useful for the earth environment.

Moreover, for example, the use of the present invention also makes it possible to perform the maintenance without external light (for example at night or in a dark room), by picturing the light emission from the solar cell with an infrared CCD camera and comparing the pictured image with predetermined reference data in color thickness (i.e., performing comparison process by computer-using data processing or the like). In this case, for example, it is possible to judge that it is time to replace a solar cell element when a ratio of a portion in which the light emission intensity is low (e.g., black portion in FIG. 8(a)) exceeds a certain ratio.

It should be noted that, needless to say, various evaluating apparatuses described in the present Description are suitably applicable to the maintenance method and maintenance system, albeit the above explanation discusses the maintenance method and maintenance system using one example of the evaluating apparatus for the solar cell.

Finally, each block of the maintenance system such as the evaluating apparatus, judging device, replacement instructing device etc. (hereinafter these blocks are referred to merely as "evaluating apparatus etc.") may be constituted by hardware logic or by software logic using a CPU as described below.

Each of the evaluating apparatus etc. is provided with: a CPU (central processing unit) for executing a program for realizing a function thereof; a ROM (read only memory) for storing the program therein; a RAM (random access memory) for expanding the program therein; a storage device (recording medium), such as a memory, for storing the program and various data; and the like. The object of the present invention can be attained by supplying the evaluating apparatus etc. respectively with recording media in which software to realize the above-mentioned functions is stored in a computer-readable manner, which software is a program code (execution form program, intermediate code program, a source program) for the evaluating apparatus etc., and then causing a computer (alternatively CPU or MPU) to read out the program code from the recording medium and execute the program code.

Examples of such a recording medium include tape-type media, such as magnetic tapes, cassette tapes and the like; disk type media such as magnetic disks (such as floppy® disks, hard disks, and the like), optical disks (such as CD-ROM, MO, MD, DVD, CD-R, and the like); a card, such as an IC card (inclusive of a memory card), and the other disks; card-type media such as IC cards (encompassing memory cards), optical cards, and the like); semiconductor memories such as mask ROM, EPROM (Erasable Programmable Read Only Memory), EEPROM (Electrically Erasable Programmable Read Only Memory), and flash ROM; and the other media.

Moreover, evaluating apparatus 10 etc. may be connected to a communication network so that the program code is supplied via the communication network. Examples of the communication network encompass Internet, Intranet, Extranet, LAN, ISDN, VAN, CATV communication network, virtual private network, telephone lines, mobile communication network, satellite communication networks, and the like. There is no particular limitation as to communication media to constitute the communication network. For example, the communication medium may be a wired communication medium such as IEEE1394, USB, power line transmission, cable TV lines, telephone lines, ADSL lines, or a wireless communication medium such as infrared ray such as IrDA or remote control, Bluetooth®, 802.11 wireless, HDR, mobile telephone network, satellite network, terrestrial digital net, and the like communication media. The present invention can be realized in a form of computer data signal embedded in a carrier wave, by which the program code is concreted as electronic transmission.

The embodiments of the present invention are descried in more details referring to Example below. Needless to say, the present invention is not limited the following Example and can be altered in details in various ways. Furthermore, the present invention is not limited to the description of the embodiments above, and can be modified in various ways within the scope of the claims. An embodiment based on a proper combination of technical means disclosed in different embodiments is encompassed in the technical scope of the present invention.

EXAMPLE

Figure 7A:
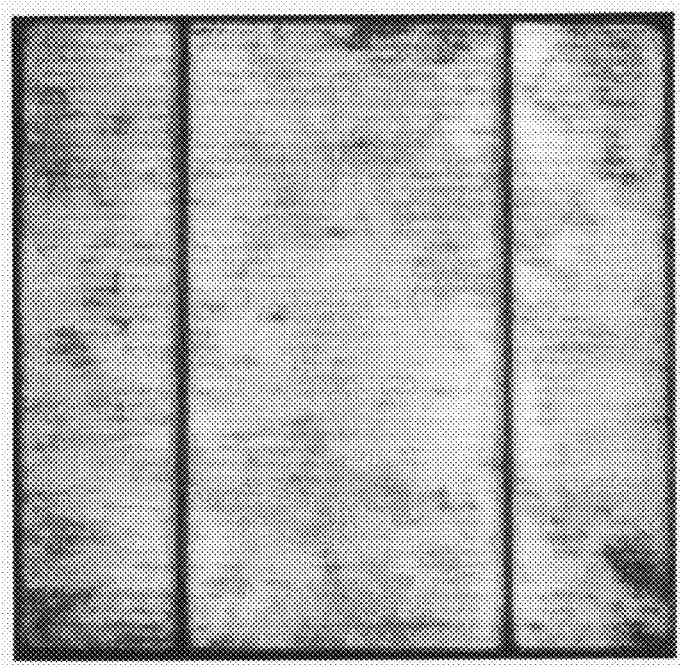
FIG. 7(a) is a view of an image picturing a state of an Si solar cell element when a current is passed therethrough, and illustrates a light emitting state of the Si solar cell element.
Figure 7B:
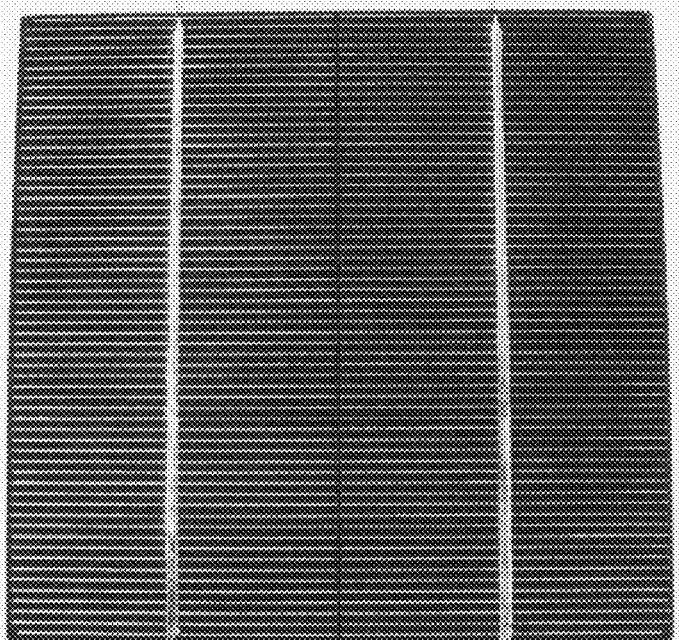
FIG. 7(b) is a view of an image picturing a state of an Si solar cell element when a current is passed therethrough, and is an optical photograph illustrating an electrode shape and the like on a surface of the Si solar cell element.

An Si solar cell element made from polycrystalline silicon semiconductor was analyzed by passing a forward current in a range of 5 to 40 mA/cm$^2$. In the present Example, an emission microscope (Hamamatsu Photonics K.K. PHEMOS-200) was used. Images picturing the Si solar cell element through which the current was passed are illustrated in FIGS. 7(a) and 7(b). FIG. 7(a) is a view illustrating a light emitting state of an Si solar cell element. FIG. 7(b) is an optical photograph of an electrode shape and the like on the surface. In FIG. 7(a), an electroluminescence (EL) light emission is observed caused by electric flow induced from an electrode. Particle fields and defects which are not observed in a regular optical photograph are clearly seen in the EL light emission image.

Figure 8:
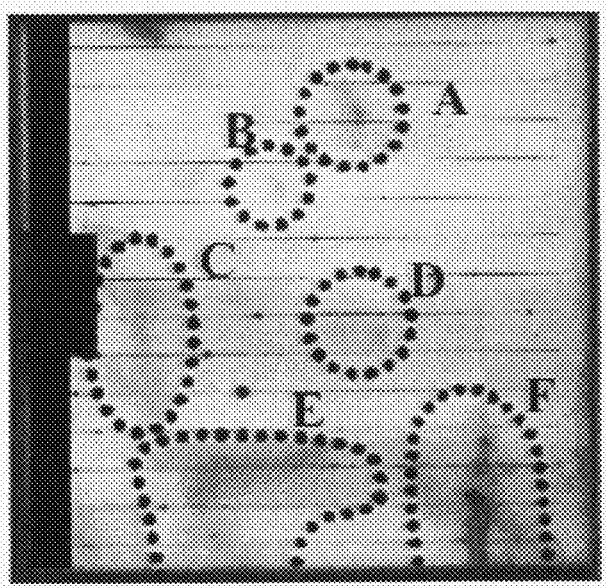
FIG. 8(a) is a view of an image picturing a state of an Si solar cell element when a current is passed therethrough, and illustrates a light emitting state of the Si solar cell element.
FIG. 8(b) is a view of an image picturing a state of an Si solar cell element when a current is passed therethrough, and illustrates a diffusion length of minority carriers (electrons) in the Si solar cell element.
Figure 8:
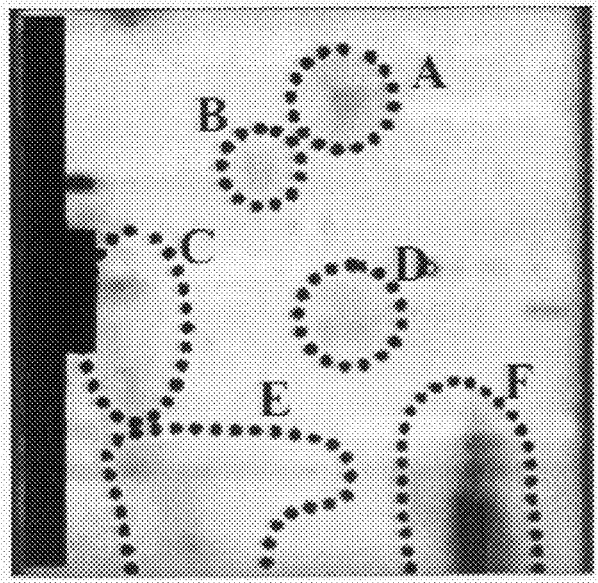

Images taken of a state of the Si solar cell element in a size of 1 cm×1 cm at the time when electric flow is induced are illustrated in FIGS. 8(a) and 8(b). FIG. 8(a) illustrates light emission from the Si solar cell element, while FIG. 8(b) illustrates a diffusion length of the minority carrier (electrons) in the Si solar cell element.

FIG. 8(a) shows that the Si solar cell element emitted strong light when the current passed therethrough. The whitish portion is a region where the light emission was strong, and the blackish portion is a region where the light emission was weak (in case of a color image, a reddish portion is the region where the light emission is strong, while a yellowish to bluish portion is the region where the light emission is weak). For example, the regions A to F circled by wavy lines are regions where the light emission was weak in FIG. 8(a).

In FIG. 8(b) illustrating the diffusion length distribution of the minority carriers, the grayish portion is a region where the diffusion length was long and whitish and blackish portions are region where the diffusion length was short (in case of a color image, a region of more reddish/orange color has a longer diffusion length, while a region of more bluish or purplish has a shorter diffusion length). For example, the regions A to F circled by wavy lines are regions where the diffusion length was short in FIG. 8(b).

FIGS. 8(a) and 8(b) demonstrates that the regions in which the strong light emission occurred when the current was passed through the Si solar cell element were matched with the regions in which the diffusion length was long, while the regions of weak light emission were matched with the region having short diffusion length. This shows that the diffusion length of the minority carriers closely relates with the light emission characteristics such as the light emission intensity of the light caused when the current was passed through the Si solar cell element. Because the diffusion length of the minority carriers are linked with a photoelectric conversion efficiency of the solar cell, the light emission characteristics obtained when the current was passed through the Si solar cell element was further analyzed in details.

Figure 9:
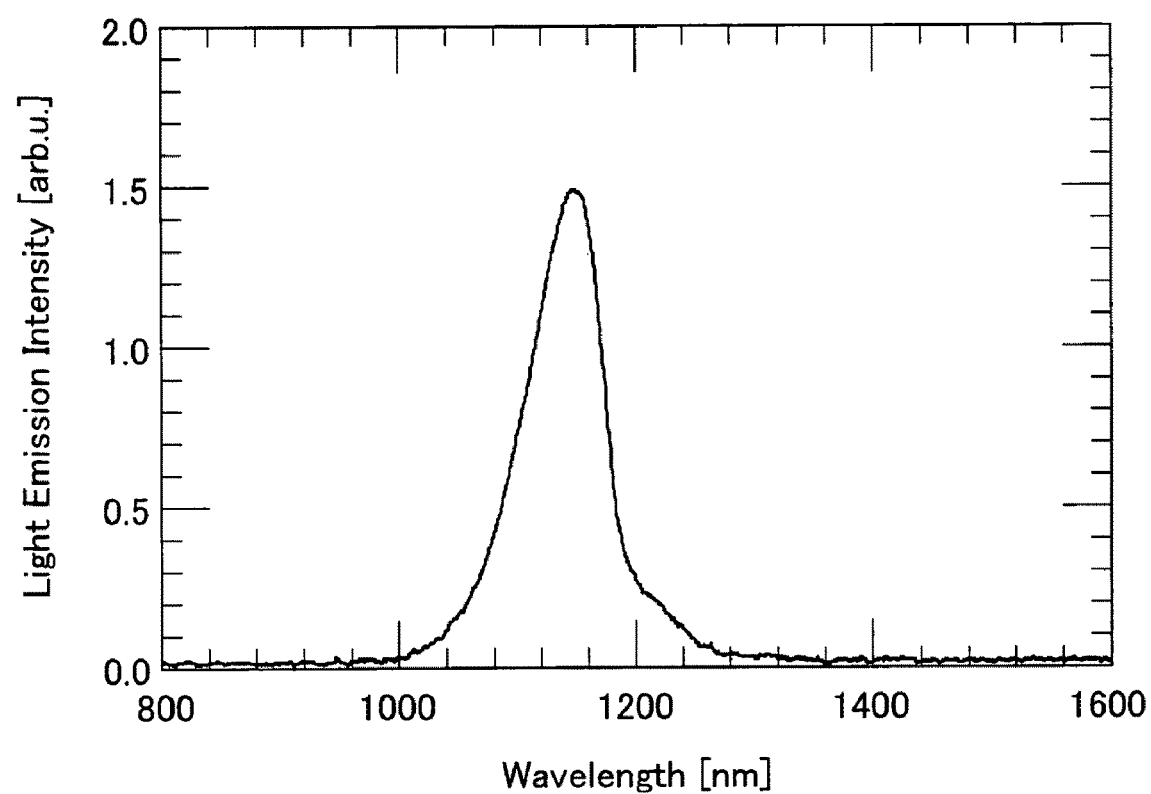
FIG. 9 is a view illustrating a result of analysis of (i) light emission intensity (EL intensity) from the Si solar cell element and (ii) wavelength of light emitted from a solar cell module, when a current is passed through an Si solar cell element.

More specifically, light emission intensity (EL intensity) obtained when a current in a range of 5 to 40 mA/cm$^2$ was passed through the Si solar cell element, and spectrum characteristics of the light emitted from a solar cell module were analyzed. The result is shown in FIG. 9. The spectrum characteristics were measured using a spectrometer (JASCO Corp. M50) and germanium detector (EDINBURGH INSTRUMENT, EI-L) according to their operation manuals.

As illustrated in FIG. 9, emission of light peaked at wavelengths of 1000 nm to 1300 nm was observed when the current was passed through the Si solar cell element.

Figure 10:
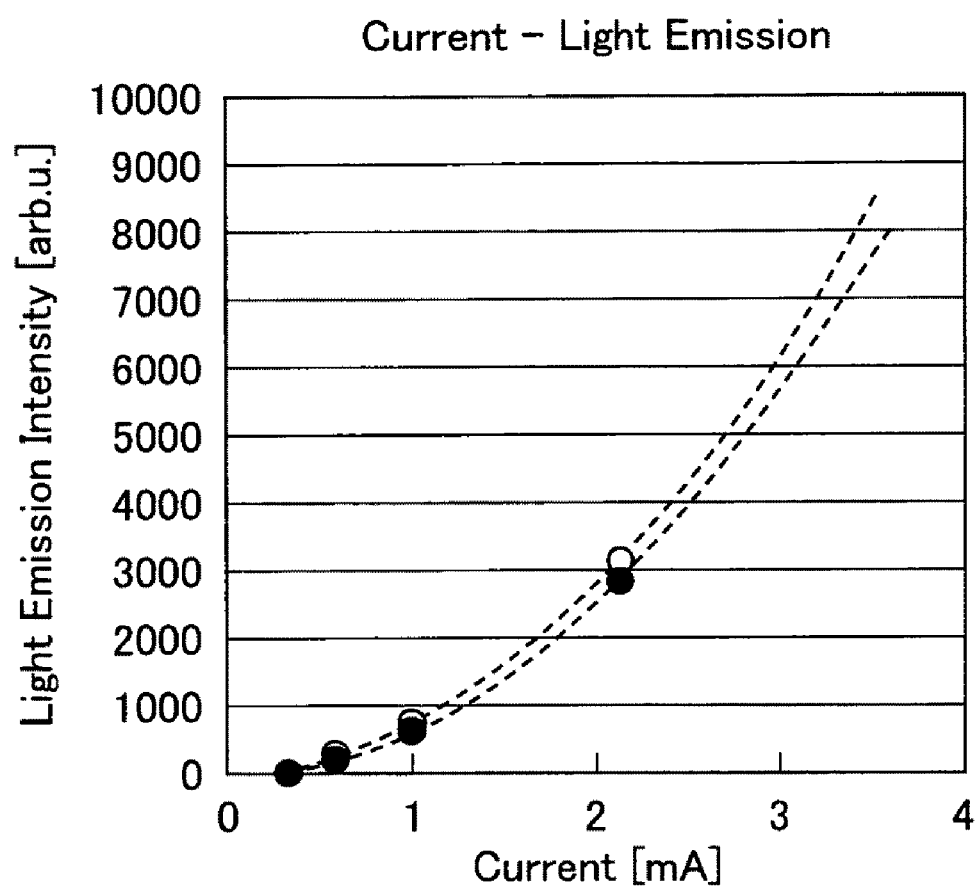
FIG. 10 is a view illustrating a result of analysis studying a relationship between an intensity of a current passing through an Si solar cell element, and a light emission intensity.

Next, a relationship between the intensity of the current to be passed through the Si solar cell element and the light emission intensity of the light was studied. The result is illustrated in FIG. 10. As illustrated in FIG. 10, the light emission intensity of the light was increased as a greater current was passed through.

Then, the result of the analysis on the diffusion length and the light emission intensity of the Si solar cell element is illustrated in FIG. 11(a), which shows readings of the diffusion length and the light emission intensity measured while the intensity of the current to pass was changed.

As illustrated in FIG. 11(a), it was demonstrated that the light emission intensity and the diffusion length of the minority carriers were in proportion. Because it is known that a longer diffusion length of the minority carriers improves the photoelectric conversion efficient of the solar cell, it can be understood that it was possible to evaluate the photoelectric conversion efficiency of the solar cell by passing the current through the solar cell and using the resultant light emission intensity as an indicator.

Moreover, FIG. 11(b) is another graph illustrating the result of analysis on the relationship between the diffusion length and the light emission intensity of the Si solar cell element especially in the case of the currents to pass (forward currents) of 6 mA/cm$^2$, 13.5 mA/cm$^2$, and 18.7 mA/cm$^2$ among the results of FIG. 11(b). In FIG. 11(b), the left vertical axis should be referred to for the two upper straight lines, while the right vertical axis should be referred to for the lower straight line, because the light emission intensity was varied in a wide range. FIG. 11(b) shows that the light emission intensity and the diffusion length were in proportion.

Figure 12:
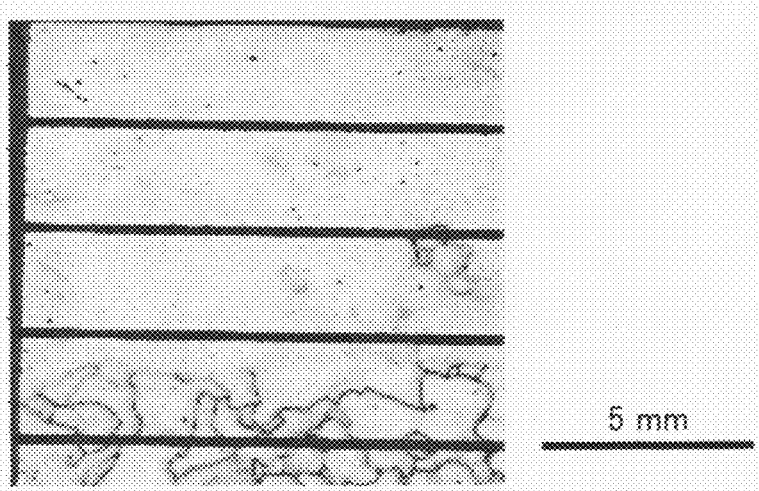
FIG. 12(a) is a view of an image picturing a state of a crystal defect of an Si solar cell element, and is a view illustrating a state of the Si solar cell element detected in accordance with LBIC.
FIG. 12(b) is a view of an image picturing a state of a crystal defect of an Si solar cell element, and is a view illustrating a state of the Si solar cell element detected in accordance with EL.
FIG. 12(c) is a view of an image picturing a state of a crystal defect of an Si solar cell element, and is a view illustrating a state of a surface of the Si solar cell element observed by an SEM (Scanning Electron Microscope).
Figure 12:
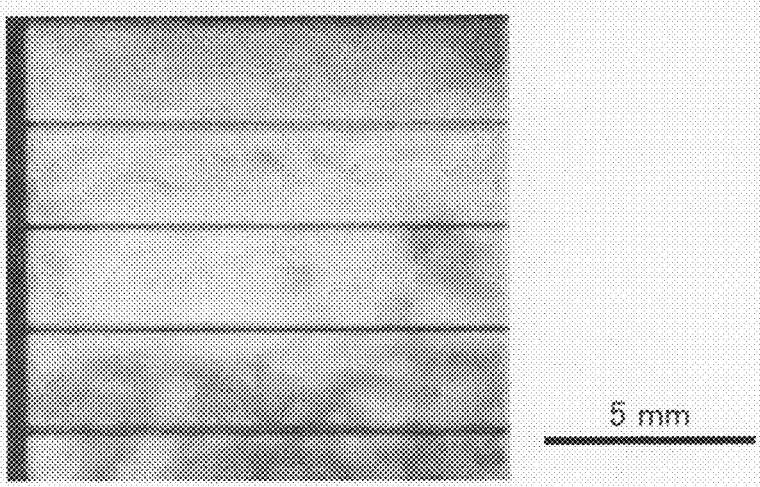
Figure 12:
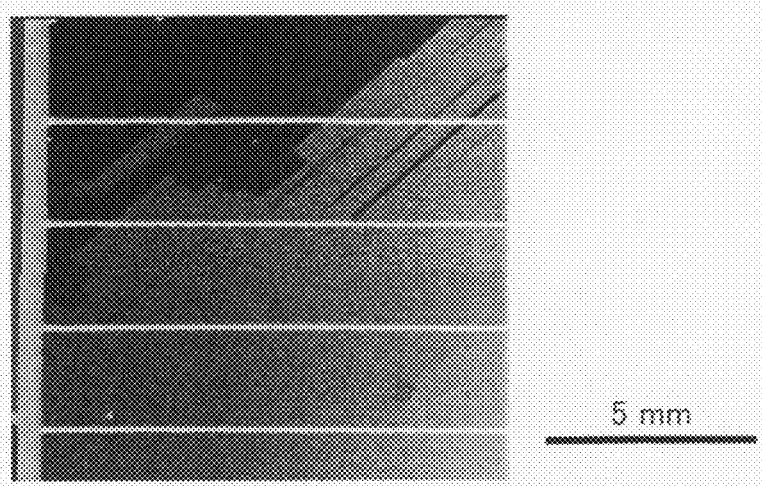

Next, images picturing states of crystal defects of an Si solar cell element are shown in figures. FIG. 12(a) shows a state of a crystal defect of an Si solar cell element which has been analyzed in accordance with LBIC. FIG. 12(b) shows an image picturing a state of a crystal defect of an Si solar cell element which has been detected in accordance with EL in which a current was passed to the solar cell element. FIG. 12(c) shows an image picturing a state of a surface of an Si solar cell element which has been observed by an SEM (Scanning Electron Microscope). A defect was observed in the image obtained by LBIC in FIG. 12(a). This was because excessively minority carriers were introduced by laser in the vicinity of the surface, and a defect in the substrate was not observed. Further, picturing was performed by scanning with a laser beam, so that it took 5 to 10 minutes to obtain the image. Compared with the image of FIG. 12(a), it is considered that the image pictured by EL (EL image) illustrates a state by observing also defects in the grain boundary and the substrate, and it took one minute or shorter to obtain the image. Anyway, the grain boundary and the like were not observed by SEM in accordance with which the image of FIG. 12(c) was pictured.

Each of (a) to (f) of FIG. 13 is an image picturing a state of a crystal defect and substrate crack which occurs to an Si solar cell element. (a) of FIG. 13 shows that a crack occurred at an electrode end. This may be because a mechanical pressure was significantly exerted onto the end in connecting the electrode. Each of (b) and (f) of FIG. 13 shows that breakage (which may be caused by the crack for example) of the electrode finger resulted in a linear black portion. Each of (b) to (e) of FIG. 13 shows that various kinds of cracks were detected and thus detected cracks had great influence on the photoelectric conversion function. EL luminescence realized by passing a current is physically symmetric with respect to generation of a current from sunlight irradiation. That is, a dark portion of the EL image indicates a portion where a current cannot be sufficiently collected also by the sunlight irradiation. Further, a crack inevitably results in a lower function and significant influence on long-term reliability of the element. Each of the images shows a characteristic of the present technique whereby it is possible to easily detect the foregoing state at high speed.

Figure 14:
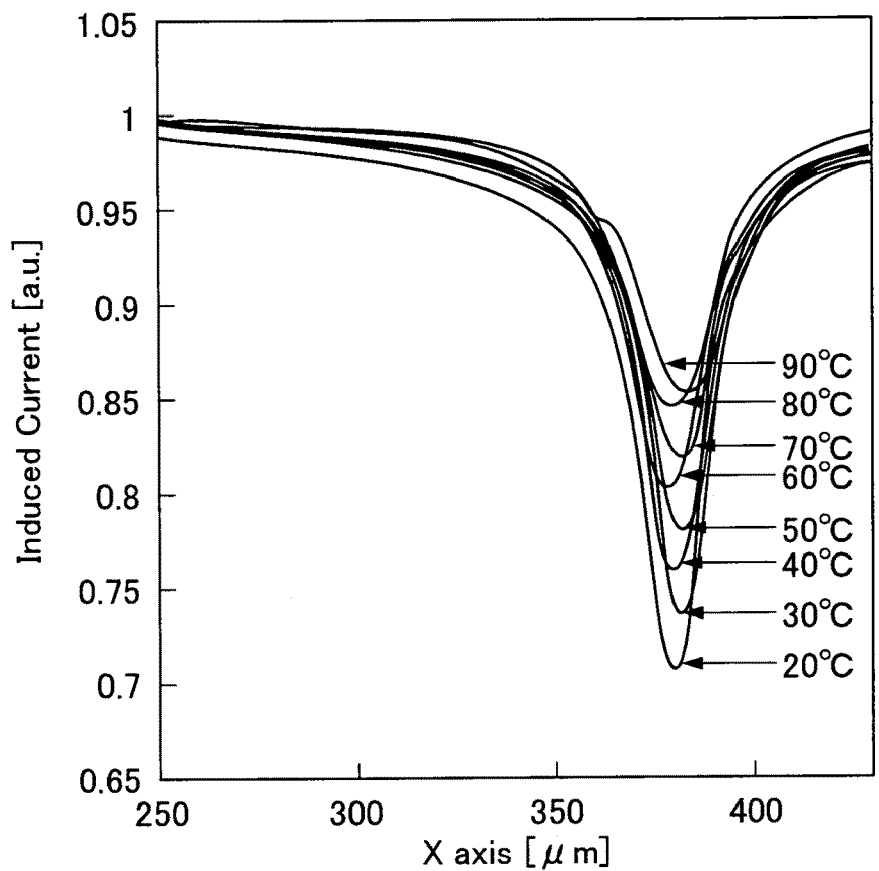
FIG. 14 is a view illustrating a result of analysis wherein a relationship between an induced current in a grain boundary of an Si solar cell element, and a temperature change.

Next, FIG. 14 shows a result of analysis on a relationship between an induced current and temperature variation in a crystal grain boundary of an Si solar cell element. Note that, in this example, the measurement was performed by the laser beam induced current method at a temperature ranging from 20° C. to 90° C. As illustrated in FIG. 14, the temperature variation had some influence in the crystal grain boundary. That is, it was found that the internal cause defect resulting from a property of the substrate depends on temperature. This can be found out also from an analysis result illustrated in FIG. 15.

Figure 15:
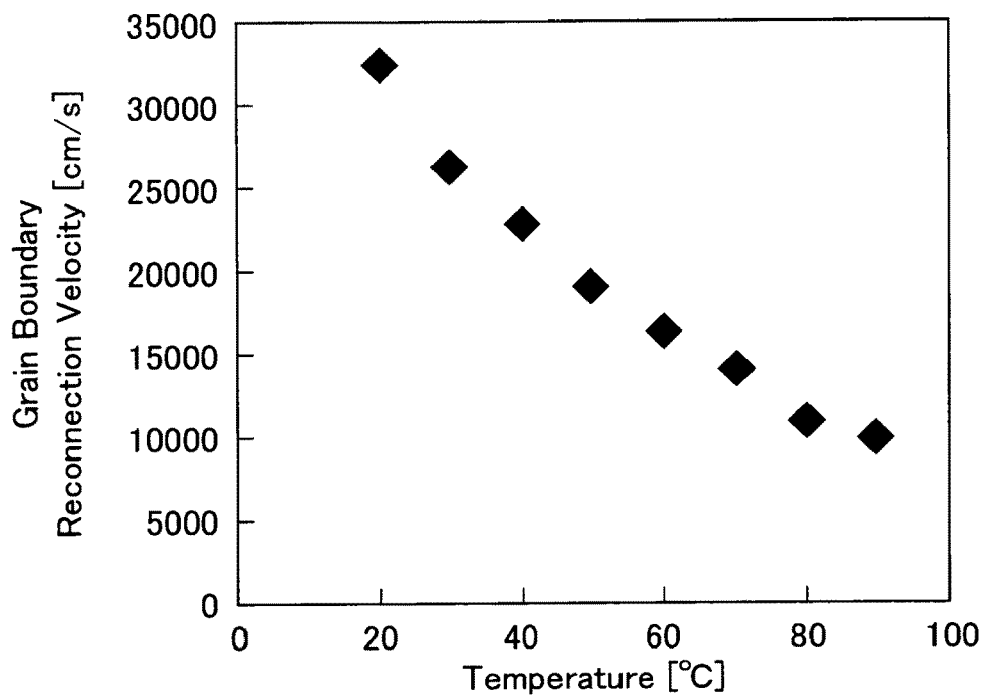
FIG. 15 is a view illustrating a result of analysis of a relationship between a grain boundary reconnection velocity and a temperature by a laser beam induced current method.

FIG. 15 illustrates a result of analysis on a relationship between a grain boundary reconnection velocity and a temperature by a laser beam induced current method. As illustrated in FIG. 15, it was found that the grain boundary reconnection velocity decreased as the temperature rose. That is, also this result shows that the internal cause defect depends on temperature.

Next, FIG. 16 illustrates images picturing a state of a crystal defect (internal cause defect) and a substrate crack (external cause defect) when a temperature given to an Si solar cell element is varied, wherein (a) illustrates a state of the internal and external cause defects at room temperature, (b) illustrates an enlarged view of a section indicated by broken lines in (a), and (c) and (d) illustrate a state of (a) and (b) when the temperature given to the Si solar cell element is 110° C. In this figure, a foggy black portion is a set of crystal defects, and a linear black portion is a substrate crack.

Figure 17:
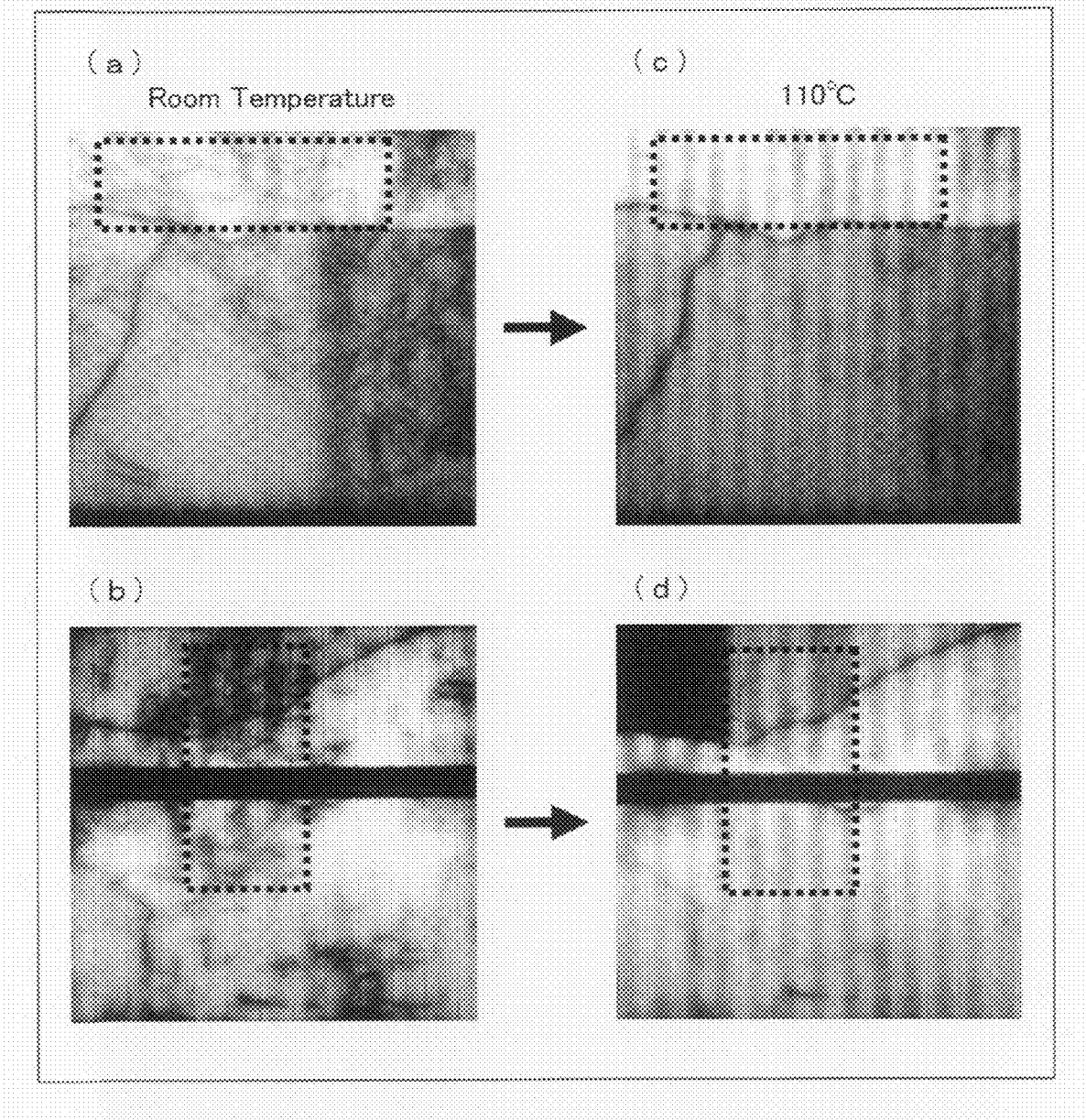
FIG. 17 is a view of images picturing a state of a crystal defect (internal cause defect) and a substrate crack (external cause defect) in an area different from FIG. 16 when a temperature given to an Si solar cell element is varied, wherein (a) and (b) illustrate a state of an internal cause defect and an external cause defect at room temperature, and (c) and (d) illustrate a state of (a) and (b) when the temperature given to the Si solar cell element is 110° C.

As illustrated in FIG. 16, it was found that the black portion indicative of the crystal defects faded when the temperature for heating the Si solar cell element was varied from room temperature to 110° C. On the other hand, as to the substrate crack, there was no influence given by the temperature variation, so that the black portion had no variation. This result can be shown also by FIG. 17 illustrating an image of a region different from the image region illustrated in FIG. 16. Also in FIG. 17, the slightly hazy black line caused by the defect in the portion surrounded by the broken line disappeared due to the heating, and only the portion influenced by the crack became more distinct (see the variation in the portion surrounded by the broken line).

In case where the Si solar cell element is heated in this manner, the black portion of the crystal defect which is an internal cause defect becomes thinner and the black portion of the substrate crack which is an external cause defect does not vary. Thus, the internal cause defect and the external cause defect in the Si solar cell element can be differentiated from each other.

Figure 18:
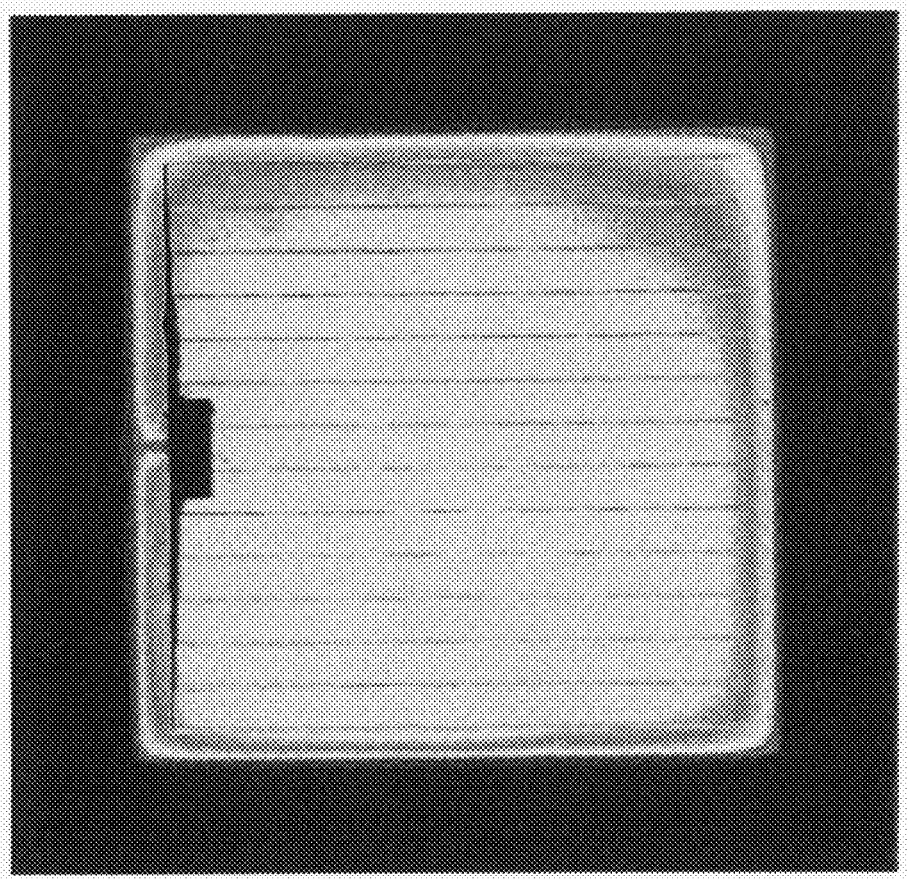
FIG. 18 is a view of an image picturing a light emitting state when a current is passed through a monocrystalline Si solar cell element.
Figure 19:
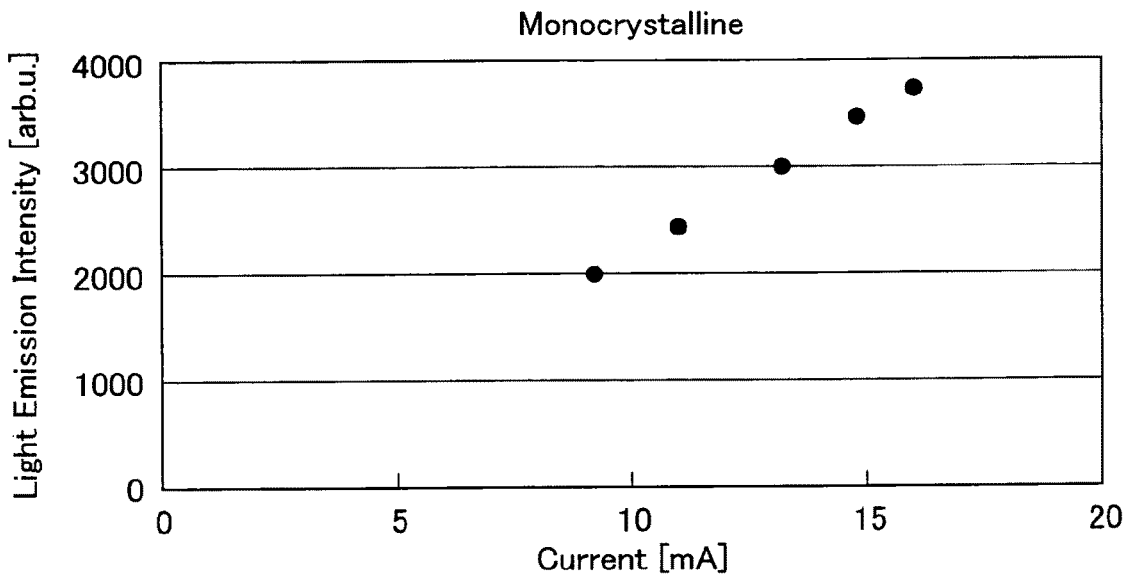
FIG. 19 is a view illustrating a result of examining a light emission intensity when a current is passed through a monocrystalline Si solar cell element.

Next, an Si solar cell element made from monocrystalline silicon semiconductor was examined to find whether it emitted light when a current was passed therethrough. The results are illustrated in FIGS. 18 and 19. FIG. 18 illustrates an image picturing the light emission of the monocrystalline Si solar cell element when the current was passed therethrough. FIG. 19 illustrates the light emission intensity of the monocrystalline Si solar cell element measured when the current was passed therethrough.

Furthermore, changes in light emission intensity (EL intensity) against a change in a current density were examined for the solar cell elements respectively using the monocrystalline silicon and the polycrystalline silicon Specifically, solar cell elements of 15×15 cm made from crystalline silicon were examined in light emission intensity by passing a current therethrough.

The result is shown in FIG. 20. As illustrated in FIG. 20, it was demonstrated that a diffusion current was dominant in the solar cell element using the monocrystalline silicon, and a gradient thereof was substantially 1. Meanwhile, it was found that the polycrystalline silicon were influenced from other current components and a gradient thereof got closer to 1 when the EL intensity was higher. The gradients indicate the diode factor and the performance of solar cell elements are better with the gradients closer to 1.

As described above, a method according to the present invention for evaluating performance of a solar cell preferably includes: a judging step of judging an evaluation as good or poor based on strengths of a light emission intensity among the light emission characteristics detected in the light emission detecting step, the evaluation being judged as good when the light emission intensity is stronger than a predetermined value, the evaluation being judged as poor when the light emission intensity is weaker than the predetermined value.

Further, the method for evaluating the performance of the solar cell preferably includes: a judging step of (i) calculating a diffusion length of a minority carrier based on a light emission intensity among the light emission characteristics detected in the light emission detecting step and (ii) judging, by use of the diffusion length as an indicator, the performance of the solar cell.

Furthermore, in the method for evaluating the performance of the solar cell, it is preferable that a current intensity of the direct current passed in the current passing step is substantially the same as that of an operating current of the solar cell element.

Moreover, in the method for evaluating the performance of the solar cell, it is preferable that: the current passing step causes a current intensity of the direct current passed to change; and the light emission detecting step detects a change in the light emission characteristics of light generated from the solar cell element in accordance with a change in the current intensity of the direct current passed in the current passing step, said method further comprising a calculation step of calculating a diode factor of the solar cell element based on the change in the current intensity and the change in the light emission characteristics.

Moreover, in the method for evaluating the performance of the solar cell, it is preferable that the temperature for heating the solar cell in the temperature control step inclusively ranges from room temperature to 130° C.

Moreover, in the method for evaluating the performance of the solar cell, it is preferable that the solar cell element includes a silicon semiconductor as its main component.

Moreover, in the method for evaluating performance of the solar cell, it is preferable that the silicon semiconductor is monocrystalline silicon semiconductor, polycrystalline silicon semiconductor, or amorphous silicon semiconductor.

Moreover, in the method for evaluating the performance of the solar cell, it is preferable that a wavelength of light detected in the light emission detecting step is in a range of 1000 nm to 1300 nm.

Further, an apparatus according to the present invention for evaluating performance of a solar cell preferably includes judging means for judging an evaluation as good or poor based on strengths of a light emission intensity among the light emission characteristics detected by the light emission detecting means as an indicator, the evaluation being judged as good when the light emission intensity is stronger than a predetermined value, the evaluation being judged as poor when the light emission intensity is weaker than the predetermined value.

Furthermore, the apparatus for evaluating the performance of the solar cell preferably includes judging means for (i) calculating a diffusion length of a minority carrier based on a light emission intensity among the light emission characteristics detected by the light emission detecting means and (ii) judging, by use of the diffusion length as an indicator, the performance of the solar cell.

Moreover, in the apparatus for evaluating the performance of the solar cell, it is preferable that: the current passing means causes current intensity of the direct current passed to change; the light emission detecting means detects a change in the light emission characteristics of light generated from the solar cell element in accordance with a change in the current intensity of the direct current passed by the current passing means, and said apparatus further comprising calculation means for calculating a diode factor of the solar cell element based on the change in the current intensity and the change in the light emission characteristics.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The method etc. according to the present invention for evaluating a solar cell is applicable not only to quality inspection in production of a solar cell module, but also to, for example, maintenance of an implemented solar cell module on a regular basis. Thus, the industrial applicability of the present invention is very wide, being not limited to inspecting apparatuses etc.

The invention claimed is:

1. A method for evaluating photoelectric conversion performance of a solar cell, comprising:
   a current passing step of passing, in a forward direction, a direct current with respect to a solar cell element constituting the solar cell;
   a temperature control step of heating the solar cell element and controlling a heating temperature of the solar cell element;
   a light emission detecting step of detecting change in light emission intensity of light generated from the solar cell element, due to the passing of the direct current in the current passing step, in accordance with change in the heating temperature in the temperature control step; and
   a judging step of judging, from the change in the light emission intensity detected in the light emission detecting step, whether the photoelectric conversion performance is good or poor, the judging step discriminating between (i) an internal cause defect caused by physical properties of a substrate material of the solar cell element and (ii) an external cause defect caused by an external factor to the solar cell element,
   the light detected in the light emission detecting step having a wavelength in a range of 1000 nm to 1300 nm.

2. The method as set forth in claim 1, wherein the judging step includes judging an evaluation as good or poor based on strengths of a light emission intensity among the light emission characteristics detected in the light emission detecting step, the evaluation being judged as good when the light emission intensity is stronger than a predetermined value, the evaluation being judged as poor when the light emission intensity is weaker than the predetermined value.

3. The method as set forth in claim 1, wherein the judging step includes (i) calculating a diffusion length of a minority carrier based on a light emission intensity among the light emission characteristics detected in the light emission detecting step and (ii) judging, by use of the diffusion length as an indicator, the performance of the solar cell.

4. The method as set forth in claim 1, wherein a current intensity of the direct current passed in the current passing step is substantially the same as that of an operating current of the solar cell element.

5. The method as set forth in claim 1, wherein the temperature for heating the solar cell in the temperature control step inclusively ranges from room temperature to 130° C.

6. The method as set forth in claim 1, wherein the solar cell element includes a silicon semiconductor as its main component.

7. The method as set forth in claim 6, wherein the silicon semiconductor is monocrystalline silicon semiconductor, polycrystalline silicon semiconductor, or amorphous silicon semiconductor.

8. A method for manufacturing a solar cell module comprising, as one step thereof, the method as set forth in claim 1.

9. An apparatus for evaluating photoelectric conversion performance of a solar cell, the apparatus comprising:
   current passing means for passing a direct current in a forward direction with respect to a solar cell element constituting the solar cell;
   temperature control means for heating the solar cell element and controlling a heating temperature of the solar cell element;
   light emission detecting means for detecting change in light emission intensity of light generated from the solar cell element, due to the passing of the direct current by the current passing means, in accordance with change in the heating temperature controlled by the temperature control means; and
   a judging means for judging, from the change in the light emission intensity detected by the light emission detecting means, whether the photoelectric conversion performance is good or poor, the judging means discriminating between (i) an internal cause defect caused by physical properties of a substrate material of the solar cell element and (ii) an external cause defect caused by an external factor to the solar cell element,
   the light detected by the light emission detecting means having a wavelength in a range of 1000 nm to 1300 nm.

10. The apparatus as set forth in claim 9, wherein the judging means judges an evaluation as good or poor based on strengths of a light emission intensity among the light emission characteristics detected by the light emission detecting means as an indicator, the evaluation being judged as good when the light emission intensity is stronger than a predetermined value, the evaluation being judged as poor when the light emission intensity is weaker than the predetermined value.

11. The apparatus as set forth in claim 9, wherein the judging means (i) calculates a diffusion length of a minority carrier based on a light emission intensity among the light emission characteristics detected by the light emission detecting means and (ii) judges, by use of the diffusion length as an indicator, the performance of the solar cell.

12. A method for maintaining a solar cell, comprising the steps of:
    carrying out evaluation of a solar cell provided on a structural object by use of the apparatus as set forth in claim 9;
    causing the judging means to judge, based on an evaluation result of the solar cell, whether or not a solar cell element whose performance is lower than a predetermined value is included in the solar cell; and
    causing a replacement instructing device to instruct a replacement party to replace the solar cell element, whose performance is lower than the predetermined value, via a communication network.

13. A solar cell maintenance system comprising:
    the apparatus as set forth in claim 9;
    wherein the judging means judges, based on an evaluation result of the apparatus, whether or not a solar cell element whose performance is lower than a predetermined value is included in a solar cell provided on a structural object; and
    a replacement instructing device for instructing a replacement party to replace the solar cell element, whose performance is lower than the predetermined value, via a communication network.

14. A method for evaluating performance of a solar cell, comprising:
    a current passing step of passing, in a forward direction, a direct current with respect to a solar cell element constituting the solar cell;
    a temperature control step of heating the solar cell element and controlling a heating temperature of the solar cell element; and a light emission detecting step of detecting change in light emission characteristics of light generated from the solar cell element, due to the passing of the direct current in the current passing step, and in accordance with change in the heating temperature of-the solar cell element in the temperature control step; wherein
    the current passing step causes a current intensity of the direct current passed to change; and
    the light emission detecting step detects a change in the light emission characteristics of light generated from the solar cell element in accordance with a change in the current intensity of the direct current passed in the current passing step,
    said method further comprising a calculation step of calculating a diode factor of the solar cell element based on the change in the current intensity and the change in the light emission characteristics.

15. An apparatus for evaluating photoelectric conversion performance of a solar cell, the apparatus comprising:
    current passing means for passing a direct current in a forward direction with respect to a solar cell element constituting the solar cell;
    temperature control means for heating the solar cell element and controlling a heating temperature of the solar cell element; and light emission detecting means for detecting change in light emission characteristics of light generated from the solar cell element, due to the passing of the direct current by the current passing means, and in accordance with change in the heating temperature of the solar cell element controlled by the temperature control means; wherein
    the current passing means causes current intensity of the direct current passed to change;
    the light emission detecting means detects a change in the light emission characteristics of light generated from the solar cell element in accordance with a change in the current intensity of the direct current passed by the current passing means, and said apparatus further comprising calculation means for calculating a diode factor of the solar cell element based on the change in the current intensity and the change in the light emission characteristics.

16. A method for evaluating performance of a solar cell, comprising:
    a current passing step of passing, in a forward direction, a direct current with respect to a solar cell element constituting the solar cell;
    a temperature control step of heating the solar cell element and controlling a heating temperature of the solar cell element; and
    a light emission detecting step of detecting change in light emission characteristics of light generated from the solar cell element, due to the passing of the direct current in the current passing step, in accordance with change in the heating temperature in the temperature control step;
    the light detected in the light emission detecting step having a wavelength in a range of 1000 nm to 1300 nm;
    wherein the current passing step causes a current intensity of the direct current passed to change; and
    the light emission detecting step detects a change in the light emission characteristics of light generated from the solar cell element in accordance with a change in the current intensity of the direct current passed in the current passing step,
    said method further comprising a calculation step of calculating a diode factor of the solar cell element based on the change in the current intensity and the change in the light emission characteristics.

17. An apparatus for evaluating photoelectric conversion performance of a solar cell, the apparatus comprising:
    current passing means for passing a direct current in a forward direction with respect to a solar cell element constituting the solar cell;
    temperature control means for heating the solar cell element and controlling a heating temperature of the solar cell element; and
    light emission detecting means for detecting change in light emission characteristics of light generated from the solar cell element, due to the passing of the direct current by the current passing means, in accordance with change in the heating temperature controlled by the temperature control means;
    the light detected by the light emission detecting means having a wavelength in a range of 1000 nm to 1300 nm;
    wherein the current passing means causes current intensity of the direct current passed to change;
    the light emission detecting means detects a change in the light emission characteristics of light generated from the solar cell element in accordance with a change in the current intensity of the direct current passed by the current passing means; and
    said apparatus further comprising calculation means for calculating a diode factor of the solar cell element based on the change in the current intensity and the change in the light emission characteristics.

* * * * *